(12) United States Patent
Chamoun

(10) Patent No.: US 9,919,754 B2
(45) Date of Patent: Mar. 20, 2018

(54) LOADING RAMP AND TRAILER

(75) Inventor: Teffy R. Chamoun, Sycamore, IL (US)

(73) Assignee: T.C. Development & Design, Inc., Cortland, IL (US)

( * ) Notice: Subject to any disclaimer, the term of this patent is extended or adjusted under 35 U.S.C. 154(b) by 461 days.

(21) Appl. No.: 13/406,425

(22) Filed: Feb. 27, 2012

(65) Prior Publication Data

US 2012/0204360 A1    Aug. 16, 2012

Related U.S. Application Data

(63) Continuation-in-part of application No. 12/537,621, filed on Aug. 7, 2009, now Pat. No. 8,123,455.

(60) Provisional application No. 61/087,020, filed on Aug. 7, 2008, provisional application No. 61/535,262, filed on Sep. 15, 2011.

(51) Int. Cl.
  *B60P 1/43* (2006.01)
  *B62D 63/06* (2006.01)

(52) U.S. Cl.
  CPC ............. *B62D 63/061* (2013.01); *B60P 1/43* (2013.01)

(58) Field of Classification Search
  CPC .. B60P 1/43; B60P 1/431; B60P 1/435; B60P 3/07; B60P 3/1025; B60P 3/1016; A61G 3/061; A61G 3/0209; B60R 9/06; B60R 9/10; B60R 7/02; B60R 9/048; B60R 9/065
  USPC ................ 414/537, 462; 224/497, 502, 519; 14/71.1, 71.3
  See application file for complete search history.

(56) References Cited

U.S. PATENT DOCUMENTS

| | | | | |
|---|---|---|---|---|
| 5,145,310 A | * | 9/1992 | Calzone | 414/537 |
| 5,752,636 A | * | 5/1998 | Manley | 224/405 |
| 5,934,698 A | * | 8/1999 | Despain | B60D 1/46 280/490.1 |
| 6,076,215 A | * | 6/2000 | Blankenship | B60P 1/43 14/69.5 |
| 6,164,895 A | * | 12/2000 | Croswell | B60P 1/4485 414/462 |
| 6,250,874 B1 | * | 6/2001 | Cross | 414/537 |
| 6,533,337 B1 | * | 3/2003 | Harshman et al. | 296/26.08 |
| 6,857,840 B2 | * | 2/2005 | Simpson et al. | 414/491 |
| 7,082,637 B1 | * | 8/2006 | Griffin | 14/69.5 |
| 8,051,519 B1 | * | 11/2011 | Adams | B60P 1/43 14/69.5 |
| 8,061,754 B1 | * | 11/2011 | Webb | B60P 1/43 14/71.1 |
| 2005/0129490 A1 | * | 6/2005 | Hutchins | B60P 3/122 414/462 |
| 2007/0065263 A1 | * | 3/2007 | Trudeau et al. | 414/482 |
| 2008/0030004 A1 | * | 2/2008 | Rempel | 280/656 |

(Continued)

*Primary Examiner* — Jonathan Snelting
(74) *Attorney, Agent, or Firm* — Husch Blackwell LLP

(57) ABSTRACT

An apparatus that includes a mainframe, first and second adjustment disks, an L-arm, and a drive is provided. The mainframe can associate with a hitch of a vehicle, and the first and second adjustment disks can be connected to respective first and second sides of the mainframe. The L-arm can connect to each of the first and second adjustment disks at a plurality of affixation points, and the drive can be braced between the mainframe and the L-arm so as to be capable of supporting the L-arm in a first position. Dimensions of the vehicle can effect at which affixation point in the plurality of affixation points that the L-arm connects to the first and second adjustment disks.

17 Claims, 39 Drawing Sheets

(56) References Cited

U.S. PATENT DOCUMENTS

2008/0250984 A1* 10/2008 Panzarella et al. ............. 108/44
2010/0124479 A1* 5/2010 Brooks ................. B60P 1/4471
　　　　　　　　　　　　　　　　　　　　414/557
2014/0161575 A1* 6/2014 Parker ................... B60P 1/4414
　　　　　　　　　　　　　　　　　　　　414/546

* cited by examiner

LOADING RAMP AND TRAILER

CROSS-REFERENCE TO RELATED APPLICATIONS

This application is a continuation-in-part of, and claims priority to, U.S. patent application Ser. No. 12/537,621 filed Aug. 7, 2009 and titled "Loading Ramp and Trailer", which claims priority to U.S. Provisional Patent Application No. 61/087,020 filed Aug. 7, 2008 and titled "Motorcycle Loading Ramp and Trailer". This application also claims priority to U.S. Provisional Patent Application No. 61/535,262 filed Sep. 15, 2011 and titled "Trailer-Ramp Hitch Mechanism". U.S. application Ser. Nos. 12/537,621; 61/087,020; and 61/535,262 are hereby incorporated by reference.

FIELD

The present invention relates generally to loading ramps and trailers. More particularly, the present invention relates to a hitch attachment mechanism that can be associated with a vehicle and with an apparatus transitioning between ramp, trailer, and transport positions.

BACKGROUND

One of the known problems associated with motorcycles, all terrain vehicles, snowmobiles, jet skis, and the like is loading these vehicles onto a truck bed or other transportation vehicle. These types of vehicles are generally extremely heavy. Accordingly, the ramps used to load them onto a truck bed must be strong enough and sturdy enough to withstand the weight of the vehicle as well as the person or persons loading the vehicle.

It is to be understood that the apparatus disclosed and discussed herein can be used in connection with motorcycles, all terrain vehicles, snowmobiles, jet skis, and the like. However, for ease of reference, the apparatus disclosed and discussed herein will be discussed with reference to a motorcycle.

When ramps are built to be strong and sturdy enough to withstand the weight of a motorcycle, they are often cumbersome and difficult for a user to set up, use, transport, and dismantle. Furthermore, often such ramps are large in size.

After a motorcycle has been loaded onto a truck bed, it is ideal to transport the ramp with the truck and motorcycle so that the ramp can be used to unload the motorcycle at the end destination. Often the ramp must be dissembled or maneuvered in such a way so that it fits on the truck bed alongside one or more motorcycles within the bed. This can be a difficult task to accomplish due to the size and weight of the ramp. Additionally, it is often difficult for a user to accomplish this task due to the size restrictions of the truck bed.

Because truck beds are limited in size, often a given truck bed cannot hold as many motorcycles as would be desired by a user. Therefore, a user may wish to attach a trailer to the hitch of a truck to transport additional cycles. However, it is often a difficult task for a user to maneuver and transport both a ramp and a trailer.

Accordingly, there is a need for improved devices.

DETAILED DESCRIPTION

Figure 1:
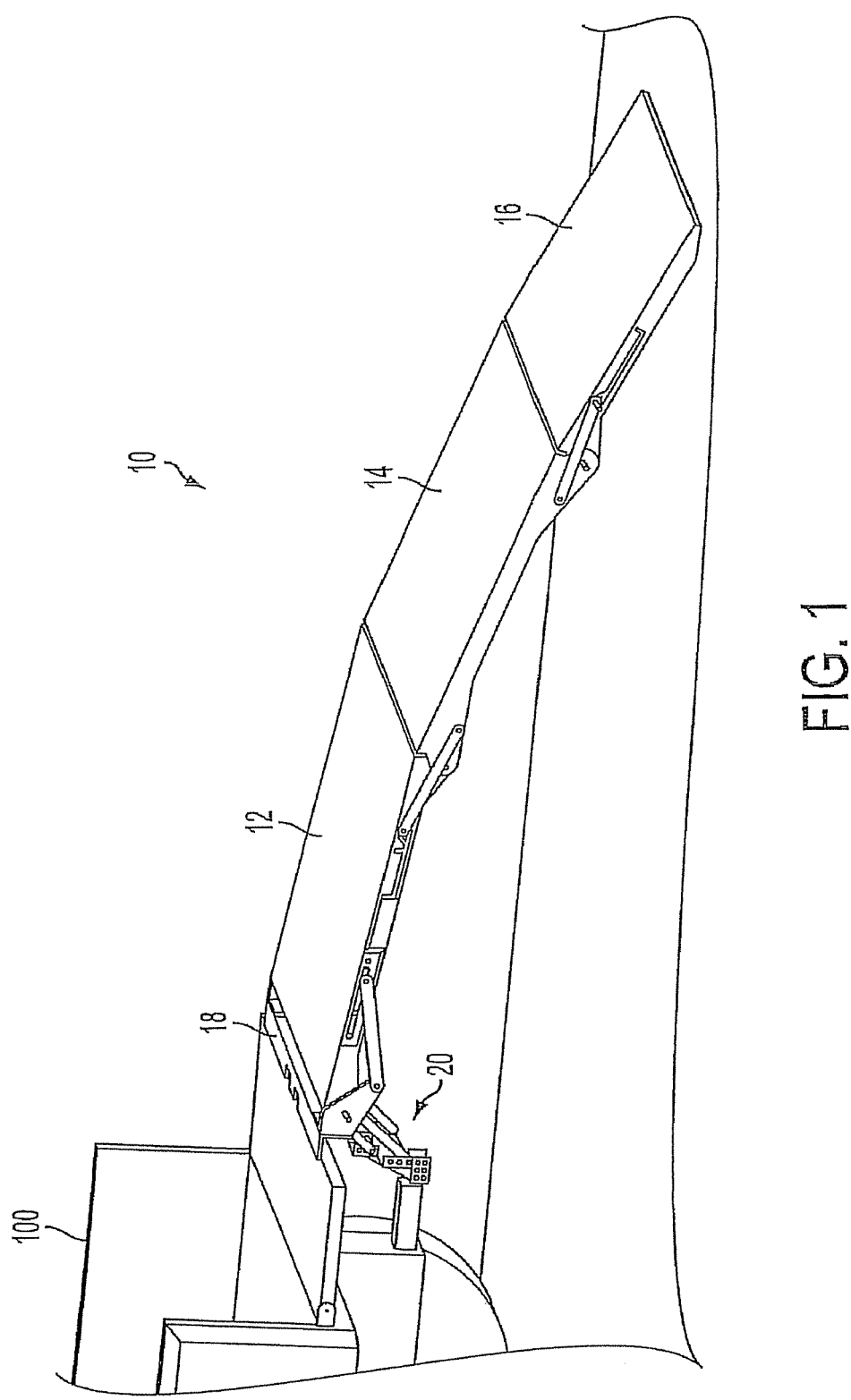
FIG. 1 is a perspective view of an apparatus in a loading position in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include an apparatus that can function as a ramp in one position and as a trailer in another position. When the apparatus is in the ramp position, vehicles can be loaded on to or unloaded off of a truck associated with the apparatus, via the apparatus. When the apparatus is in a trailer position, the apparatus can transport vehicles secured thereon. In some embodiments, the apparatus can be associated with a truck and transported therewith even when the apparatus is in neither the ramp position nor the trailer position.

The Apparatus Functioning as a Ramp

FIG. 1 is a perspective view of an apparatus 10 in a ramp or loading position in accordance with disclosed embodiments. As seen in FIG. 1, the apparatus 10 can be associated with a hitch attachment mechanism 20 and a support mechanism 18 and include three sections: a first section 12, a second section 14, and a third section 16. The apparatus 10 can be associated with a truck 100 or other vehicle.

The hitch attachment mechanism 20 can associate with the hitch of the truck 100 as known by those of ordinary skill in the art. The hitch attachment mechanism 20 can also facilitate the apparatus 10 moving between the loading and trailing positions, as will be described in more detail herein.

The support mechanism 18 can be attached to the upper end of the hitch attachment mechanism 20. The support mechanism 18 can also be attached to the front side of the first section 12, as will be described in more detail herein.

Each of the first 12, second 14, and third sections 16 of the apparatus 10 can be rectangular in shape and have top, bottom, front, rear, left and right sides. In some embodiments, the first section 12 can be larger than the second section 14, and the second section 14 can be larger than the third section 16.

The front side of the first section 12 can be rotatably connected to the support mechanism 18, and the rear side of the first section 12 can be rotatably connected to the front side of the second section 14. The rear side of the second section 14 can be rotatably connected to the front side of the third section 16. The rotatable connections between the support mechanism 18, the first section 12, the second section 14, and the third section 16 can be spring loaded hinges as known by those of ordinary skill in the art. Further, locking mechanisms 40, 50, and 60 can be associated with each of these rotatable connections. The rotatable connections, spring loaded hinges, and locking mechanisms of the apparatus 10 will be described in greater detail herein.

When in the loading position, the apparatus 10 can extend from an open bed door of the truck 100 to the ground. When the bed door of the truck 100 is in an open position, as seen in FIG. 1, the support mechanism 18 can be associated with the open bed door. The support mechanism 18 can be placed flush with or in close proximity to the open bed door so that the support mechanism 18 can act as a conduit between the first section 12 of the apparatus 10 and the open bed door of the truck 100. In some embodiments, the support mechanism 18 can be secured to the open bed door with latches, knobs, or other affixing mechanisms as known by those of skill in the art.

Because the first section 12 of the apparatus 10 can be rotatably connected to the support mechanism 18 and to the second section 14, and because the second section 14 can be rotatably connected to the third section 16, the apparatus 10 can extend from the open bed door of the truck 100 to the ground at an angle suitable for loading and unloading vehicles on to or off of the truck 100, via the apparatus 10. As seen in FIG. 1, the angles between the support mechanism 18, and the first 12, second 14, and third sections 16 of the apparatus 10 are not identical. In some embodiments, the angle between the first section 12 and the second section 14 can be smaller than the angle between the second section 14 and the third section 16.

Accordingly, when the apparatus 10 is in a ramp or loading position, as shown in FIG. 1, the apparatus 10 can function as a ramp so that vehicles can be loaded onto or unloaded off of the truck 100, via the apparatus 10.

The Apparatus Functioning as a Trailer

Figure 2:
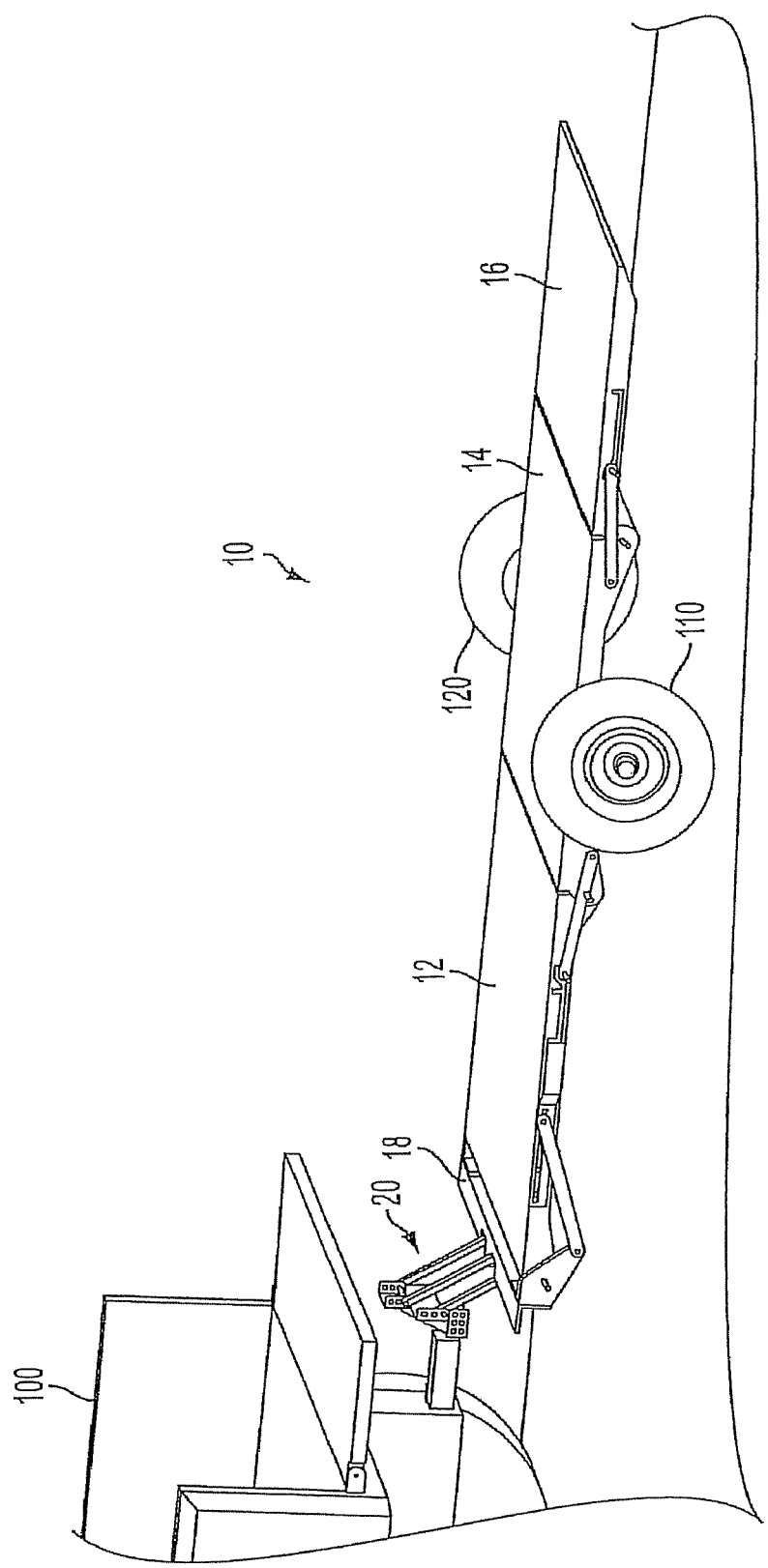
FIG. 2 is a perspective view of an apparatus in a trailing position in accordance with disclosed embodiments.

FIG. 2 is a perspective view of the apparatus 10 in a trailer or trailing position in accordance with disclosed embodiments. The hitch attachment mechanism 20 can move from a first position as seen in FIG. 1 to a second position as seen in FIG. 2.

When the apparatus 10 is in a trailing position, as seen in FIG. 2, the angles between the support mechanism 18 and the first section 12, between the first section 12 and the second section 14, and between the second section 14 and the third section 16 can be approximately 180°. The locking mechanisms 40, 50, and 60 associated with the connections between the support mechanism 18 and the first section 12, between the first section and the second section 14, and between the second section 14 and the third section can be secured so that the support mechanism 18 and the first 12, second 14, and third sections 16 of the apparatus 10 are held in place at approximately 180° relative to one another.

The top sides of the first 12, second 14, and third sections 16 can create a flat surface when the apparatus 10 is in the trailing position of FIG. 2. Accordingly, motorcycles or the like can be secured thereon with tie down apparatuses or wheel chocks as known by those of ordinary skill in the art.

In some embodiments, motorcycles can be loaded onto the apparatus 10 in the trailing position via the third section 16. The third section 16 can rotate down (as in the loading position) so that the third section 16 extends from the rear side of the second section 14 to the ground. Thus, the third section 16 can act as a ramp for the apparatus 10 in the trailing position.

In some embodiments, the third section 16 can also be rotatably connected to the second section 14 so that the third section 16 rotates up to an approximately 90° angle relative to the second section 14. When rotated to the approximately 90° angle, the third section 16 can extend in a vertical direction upwards from the rear side of the second section 14. In this manner, the third section 16 can function as a back door to the apparatus 10 in the trailing position.

An axle with left and right wheels 110 and 120 can be affixed to the bottom side of the second section 14 as would be known by those of ordinary skill in the art. When the hitch attachment mechanism 20 is associated with the truck 100, the apparatus 10 and the vehicles secured thereon can be transported with the truck, and the apparatus 10 can move with the truck 100 via the rotating wheels 110 and 120.

Accordingly, when the apparatus 10 is in a trailer or trailing position, as shown in FIG. 2, the apparatus 10 can function as a trailer so that vehicles can be secured thereon and transported therewith.

The Apparatus in a Transporting Position

Figure 3:
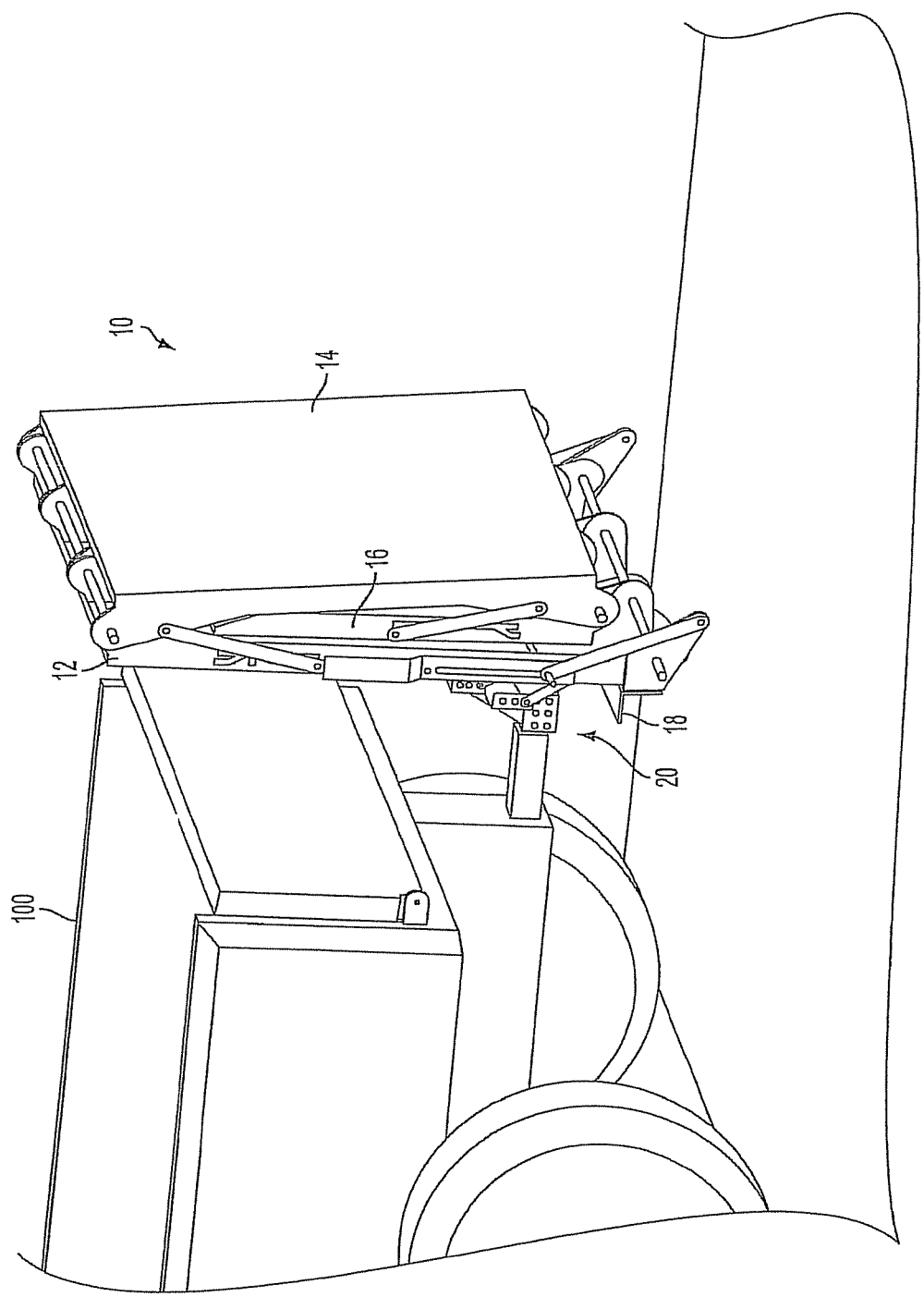
FIG. 3 is a perspective view of an apparatus in a transporting position in accordance with disclosed embodiments.
Figure 4:
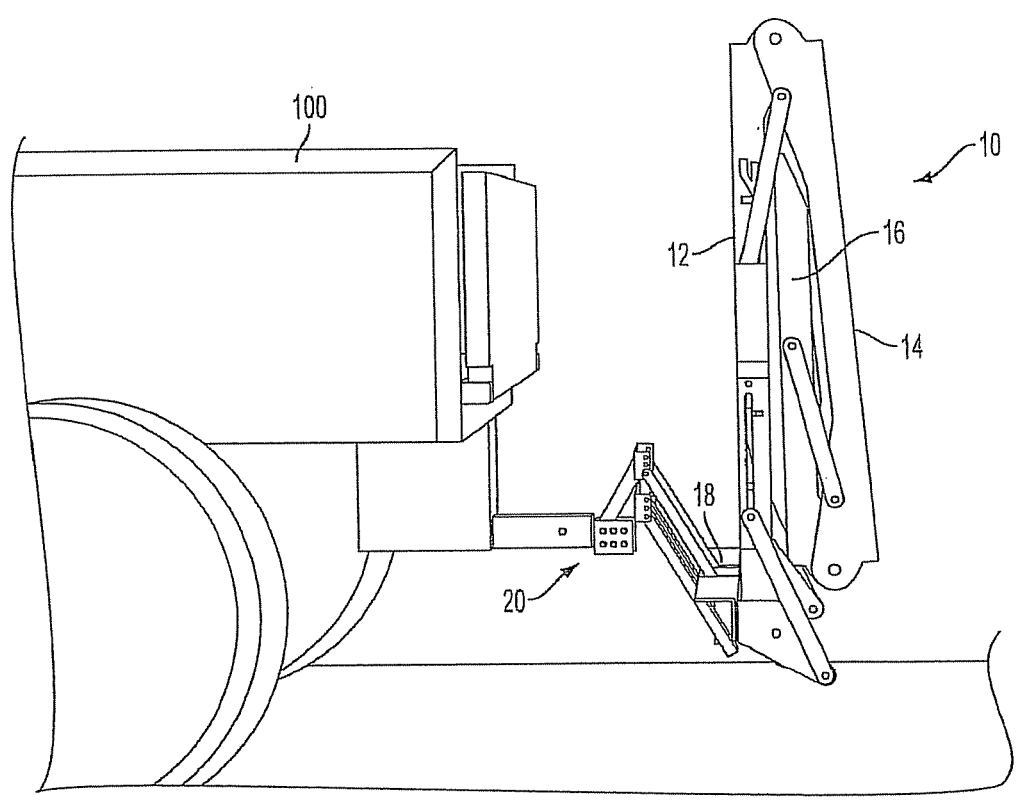
FIG. 4 is a side view of an apparatus in a transporting position in accordance with disclosed embodiments.

FIG. 3 is a perspective view of the apparatus 10 in a transporting position in accordance with disclosed embodiments, and FIG. 4 is a side view of the apparatus 10 in the transporting position. When the hitch attachment mechanism 20 is in the second position as seen in FIG. 2, FIG. 3, and FIG. 4, the apparatus 10 can be in the trailing position as seen in FIG. 2 and as described above. However, the apparatus can alternatively be in a transporting position as seen in FIG. 3 and FIG. 4.

After a user loads or unloads vehicles onto or off of the truck 100, the user may wish to transport the apparatus with the truck 100. However, if there are no vehicles to load onto the apparatus 10 and transport therewith as in the trailing position, it is desirable to place the apparatus 10 in the transporting position.

When the apparatus 10 is in the transporting position, as seen in FIG. 3 and FIG. 4, the first 12, second 14, and third sections 14 of the apparatus 10 can be folded can be into one another. The third section 16 can rotate about the connection between the second section 14 and the third section 16 so that the third section 16 folds underneath the second section 14. In the transporting position, the bottom sides of the second 14 and third sections 16 can face one another.

Similarly, the second section 14 can rotate about the connection between the first section 12 and the second section 14 so that the second section 14 extends way from the first section 12. In the transporting position, the top side of the second section 14 can face away from the truck 100, and the top side of the third section 16 can face the bottom side of the first section 12.

The first section 12 can rotate about the connection between the support mechanism 18 and the first section 12 so that the first section 12 extends upward in a vertical direction away from the support mechanism 18. In the transporting position, the top of the first section 12 can face towards the truck 100.

The locking mechanisms 40, 50, and 60 associated with the connections between the support mechanism 18 and the first section 12, between the first section and the second section 14, and between the second section 14 and the third section 16 can be secured so that the support mechanism 18 and the first 12, second 14, and third sections 16 of the apparatus are held in place in the transporting position. In some embodiments, additional locking mechanisms can be placed on the sides of the first 12, second 14, and third sections 16 to secure the sides of each section together when they are folded into one another.

Accordingly, when the apparatus 10 is in a transporting position, the apparatus 10 can be associated with a truck and transported therewith when the apparatus is in neither the ramp position nor the trailer position.

One Embodiment of a Hitch Attachment Mechanism

Figure 5:
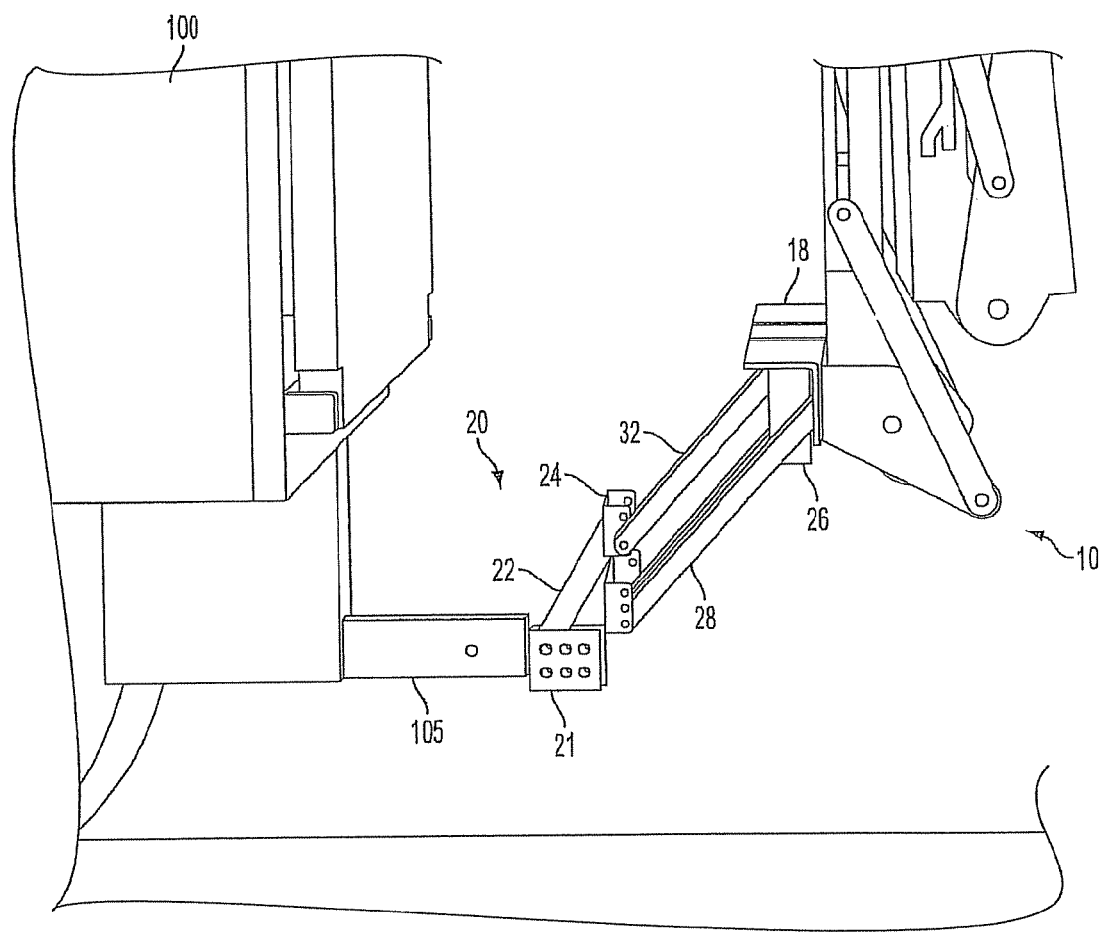
FIG. 5 is a side view of one embodiment of the hitch attachment mechanism in a first position.
Figure 6:
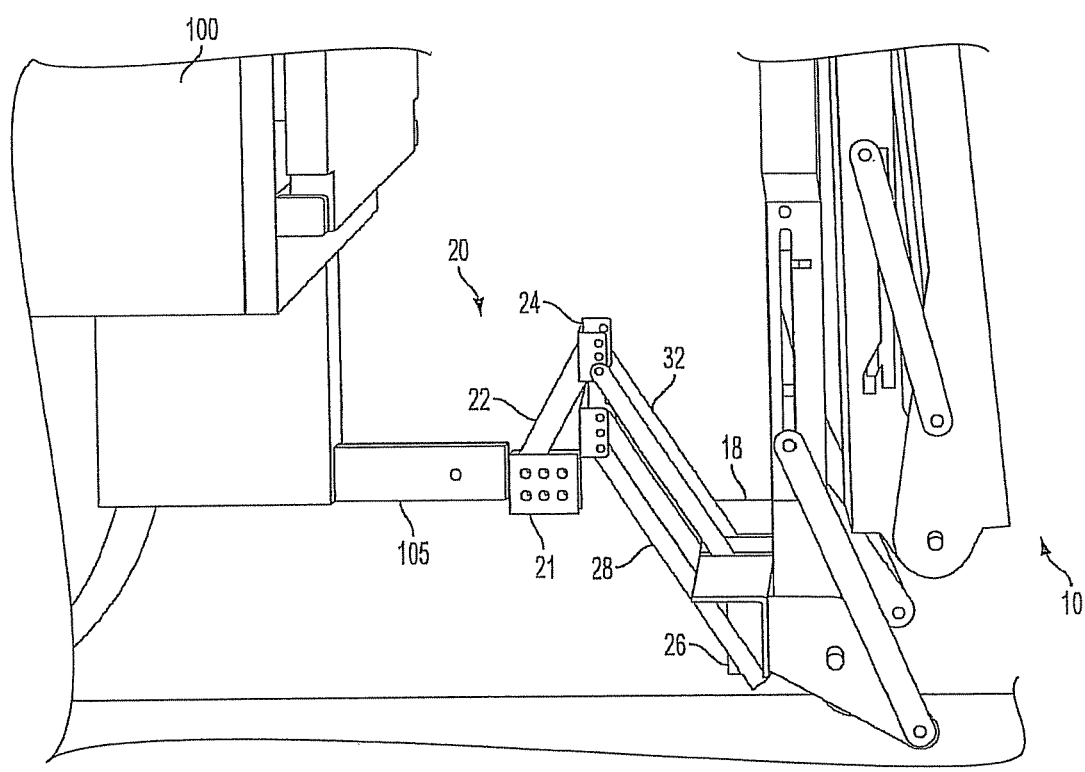
FIG. 6 is a side view of the hitch attachment mechanism of FIG. 5 in a second position.

As explained above, the hitch attachment mechanism 20 can move from a first position to a second position. FIG. 5 is a side view of a one embodiment of the hitch attachment mechanism 20 in the first position, and FIG. 6 is a side view of the hitch attachment mechanism 20 in the second position. The hitch attachment mechanism 20 can be attached to the trailer hitch 105 of a truck 100 as is known by those or ordinary skill in the art.

The first embodiment of the hitch attachment mechanism 20 can include a depth selecting mechanism 21, first and second stationary supports 22 and 23, first and second height selecting mechanisms 24 and 26, and first, second, third, and fourth rotating supports 28, 30, 32, and 34.

The depth selecting mechanism 21 can include a front portion that attaches to the trailer hitch 105 as is known by those of skill in the art. The depth selecting mechanism 21 can also include a plurality of holes disposed therein for connecting to first ends of the first and second stationary supports 22 and 23. The first stationary support 22 can connect to the left side of the depth selecting mechanism 21 and the second stationary support 23 (not shown) can connect to the right side of the depth selecting mechanism 21. The first ends of the first and second stationary supports 22 and 23 can be welded to the depth selecting mechanism 21 or affixed thereto with a pin, bolt, screw, or any other fastening mechanism as would be known by those of ordinary skill in the art.

The height of a bed door of a truck in a closed position, and accordingly the depth of the bed door in an open position, can vary. As explained above, when the hitch attachment mechanism 20 is in a first position, and the bed door of the truck 100 is opened, the support mechanism 18 can be placed in close proximity to or flush with the bed door. Accordingly, it is desirable to adjust the hitch attachment mechanism 20 to accommodate the depth of the bed door in the open position.

The plurality of holes disposed in the depth selecting mechanism 21 can provides a plurality of affixation points for the first and second stationary supports 22 and 23. Accordingly, one hitch attachment mechanism 20 can be used with multiple trucks, which may have bed doors of varying dimensions.

Second ends of the first and second stationary supports 22 and 23 can be connected to a first height selecting mechanism 24. The first stationary support 22 can be connected to the left side of the first height selecting mechanism 24, and the second stationary support 23 (not shown) can be connected to the right side of the first height selecting mechanism 24. The first and second stationary supports 22 and 23 can be welded to the first height selecting mechanism 24 or affixed thereto with a pin, screw, bolt, or any other fastening mechanism as would be known by those of ordinary skill in the art.

First ends of the first, second, third, and fourth rotating supports 28, 30, 32, and 34 can be rotatably connected to the first height selecting mechanism 24. The first rotating support 28 can be connected to the bottom left side of the first height selecting mechanism 24, and the second rotating support 30 (not shown) can be connected to the bottom right side of the first height selecting mechanism 24. Similarly, the third rotating support 32 can be connected to the top left side of the first height selecting mechanism 24, and the fourth rotating support 34 (not shown) can be connected to the top right side of the first height selecting mechanism 24.

The first, second, third, and fourth rotating supports 28, 30, 32, and 34 can be connected to the first height selecting mechanism 24 with any rotatable mechanism as would be known by those of skill in the art, including, a pin, bolt, or other fastening mechanism. The first height selecting mechanism 24 can include a plurality of holes disposed therein for connecting to the first and second stationary supports 22 and 23 and to the first, second, third, and fourth rotating supports 28, 30, 32, and 34.

Trucks used in connection with the apparatus disclosed herein can have varying elevations due to the size of the tires or the size of the chassis, for example. As explained above, when the hitch attachment mechanism 20 is in a first position, and the bed door of the truck 100 is open, the support mechanism 18 can be placed in close proximity to or flush with the bed door. Accordingly, it is desirable to adjust the hitch attachment mechanism 20 to accommodate the height of the truck.

The plurality of holes disposed in the first height selecting mechanism 24 can provide a plurality of affixation points for the first and second stationary supports 22 and 23 and for the first, second, third, and fourth rotating supports 28, 30, 32, and 34. Accordingly, one hitch attachment mechanism 20 can be used with multiple trucks, which may have varying heights.

Second ends of the first, second, third, and fourth rotating supports 28, 30, 32, and 34 can be rotatably connected to the second height selecting mechanism 26. The first rotating support 28 can be connected to the bottom left side of the second height selecting mechanism 26, and the second rotating support 30 (not shown) can be connected to the bottom right side of the second height selecting mechanism 26. Similarly, the third rotating support 32 can be connected to the top left side of the second height selecting mechanism 26, and the fourth rotating support 34 (not shown) can be connected to the top right side of the second height selecting mechanism 26.

The first, second, third, and fourth rotating supports 28, 30, 32, and 34 can be connected to the second height selecting mechanism 26 with any rotatable mechanism as would be known by those of skill in the art, including, a pin, bolt, or other fastening mechanism. The second height selecting mechanism 26 can includes, a plurality of holes disposed therein for connecting to the first, second, third, and fourth rotating supports 28, 30, 32, and 34.

As explained above, it is desirable to adjust the hitch attachment mechanism 20 to accommodate the height of the truck. The plurality of holes disposed in the second height selecting mechanism 26 can provide a plurality of affixation points for the first, second, third, and fourth rotating supports 28, 30, 32, and 34. Accordingly, one hitch attachment mechanism 20 can be used with multiple trucks, which may have varying heights.

The second height selecting mechanism 26 can be connected to the support mechanism 18. The second height selecting mechanism 26 can be welded to the support mechanism 18 or affixed thereto with a pin, bolt, screw, or any other fastening mechanism as would be known by those of ordinary skill in the art.

The hitch attachment mechanism 20 can move from a first position, as seen in FIG. 5, to a second position, as seen in FIG. 6, or vice versa. When the hitch attachment mechanism 20 moves from the first position to the second position, or vice versa, the first ends of the first, second, third, and fourth rotating supports 28, 30, 32, and 34 can rotate about their respective connections to the first height selecting mechanism 24. Similarly, the second ends of the first, second, third, and fourth rotating supports 28, 30, 32, and 34 can rotate about their respective connections to the second height selecting mechanism 26. In some embodiments, the first and second stationary supports 22 and 23 do not move when the hitch attachment mechanism 20 moves from the first position to the second position.

The rotatable connections between the first, second, third and fourth rotating supports 28, 30, 32, and 34 and the first and second height selecting mechanisms 24 and 26 can be spring loaded such that kinetic energy applied to the springs associated with these connections can be used to assist a user in moving the hitch attachment mechanism 20 from the first position, as seen in FIG. 5, to the second position, as seen in FIG. 6.

As will be understood by those of ordinary skill in the art, springs can be associated with the rotatable connections of the hitch attachment mechanism 20 to counter the weight/mass of the hitch attachment mechanism 20, the support mechanism 18, and the first, second and third sections 12, 14, and 16. In this manner, the ascent or descent of these parts can be controlled. In some embodiments, coil springs, leaf springs, or any other type of spring can be used. In some embodiments, electronic compression and release devices can be incorporated to automate the hitch attachment mechanism 20 of disclosed embodiments.

Locking mechanisms can be associated with the rotatable connections of the hitch attachment mechanism 20. When the mechanism 20 moves from the first position to the second position, or vice versa, the locking mechanisms can engage to ensure that the mechanism 20 stays in the desired position until a user disengages to the locking mechanisms so as to move the mechanism 20 to a new position.

Moving the Apparatus Between Positions

In accordance with disclosed embodiments, the apparatus 10 can be moved from the transporting position (FIG. 3) to the loading position (FIG. 1) to the trailing position (FIG. 2) and back again. The apparatus 10 will now be described in relation to its various intermediate positions as it moves from the transporting position to the loading position, to the trailing position.

Figure 7:
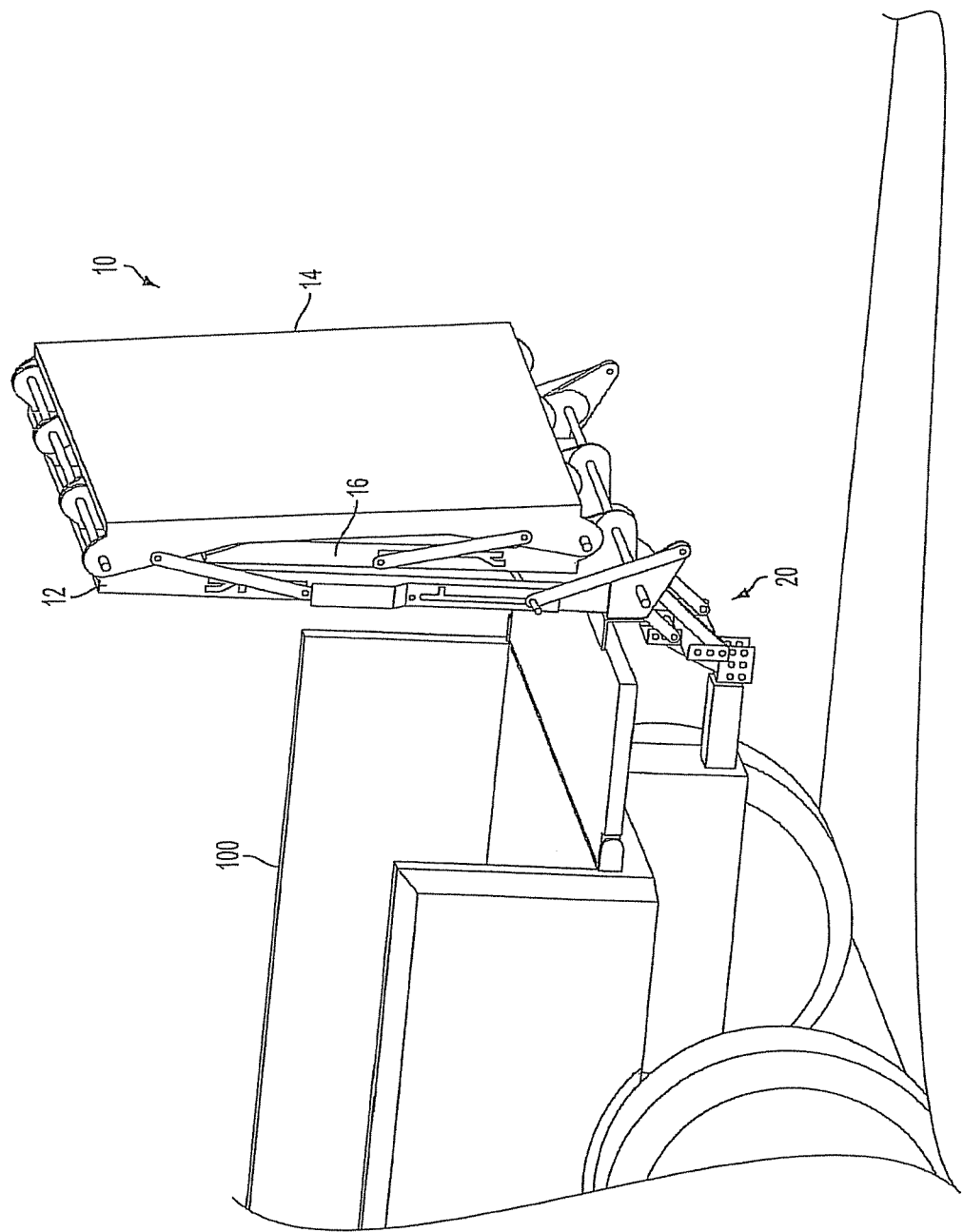
FIG. 7 is a perspective view of an apparatus in a first position in accordance with disclosed embodiments.

As seen in FIG. 3, the apparatus 10 can start in the transporting position. Then, the apparatus 10 can move from the transporting position to a first position as seen in FIG. 7. To move from the transporting position to the first position, the hitch attachment mechanism 20 can be moved from its second position (FIG. 6) to its first position (FIG. 5), as explained above.

When the apparatus 10 is in its transporting position (FIG. 3) and the hitch attachment mechanism 20 is in its second position (FIG. 6), the first, second, third, and fourth rotating supports 28, 30, 32, and 34 can extend in a downward direction from the first height selecting mechanism 24 to the second height selecting mechanism 26.

The hitch attachment mechanism 20 can move from its second position (FIG. 6) to its first position (FIG. 5) in the manner described above, using the springs associated with the rotatable connections of the mechanism 20. When the apparatus 10 is in its first position (FIG. 7) and the hitch attachment mechanism 20 is in its first position (FIG. 5), the first, second, third, and fourth rotating supports 28, 30, 32, and 34 can extend in an upward direction from the first height selecting mechanism 24 to the second height selecting mechanism 26.

As seen in FIG. 7, when the apparatus 10 is in its first position, the support mechanism 18 can be in close proximity to or flush with an open bed door of the truck 100. The first, second, and third sections 12, 14, and 16 can be folded into one another as in the transporting position, described above with reference to FIG. 3. In the first position, the first section 12 can be substantially perpendicular to the support mechanism 18.

Figure 8:
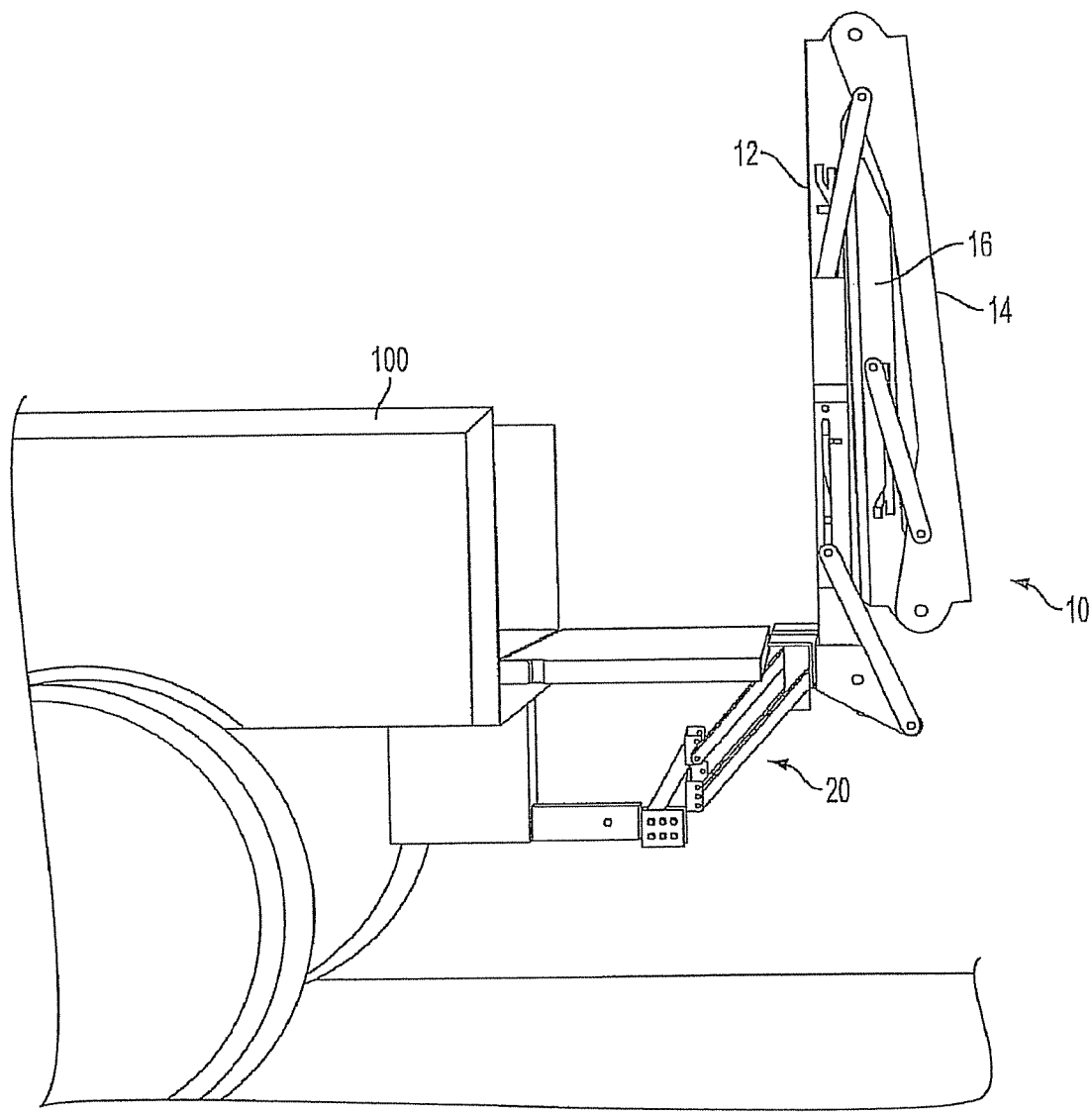
FIG. 8 is a side view of an apparatus in the first position in accordance with disclosed embodiments.
Figure 9:
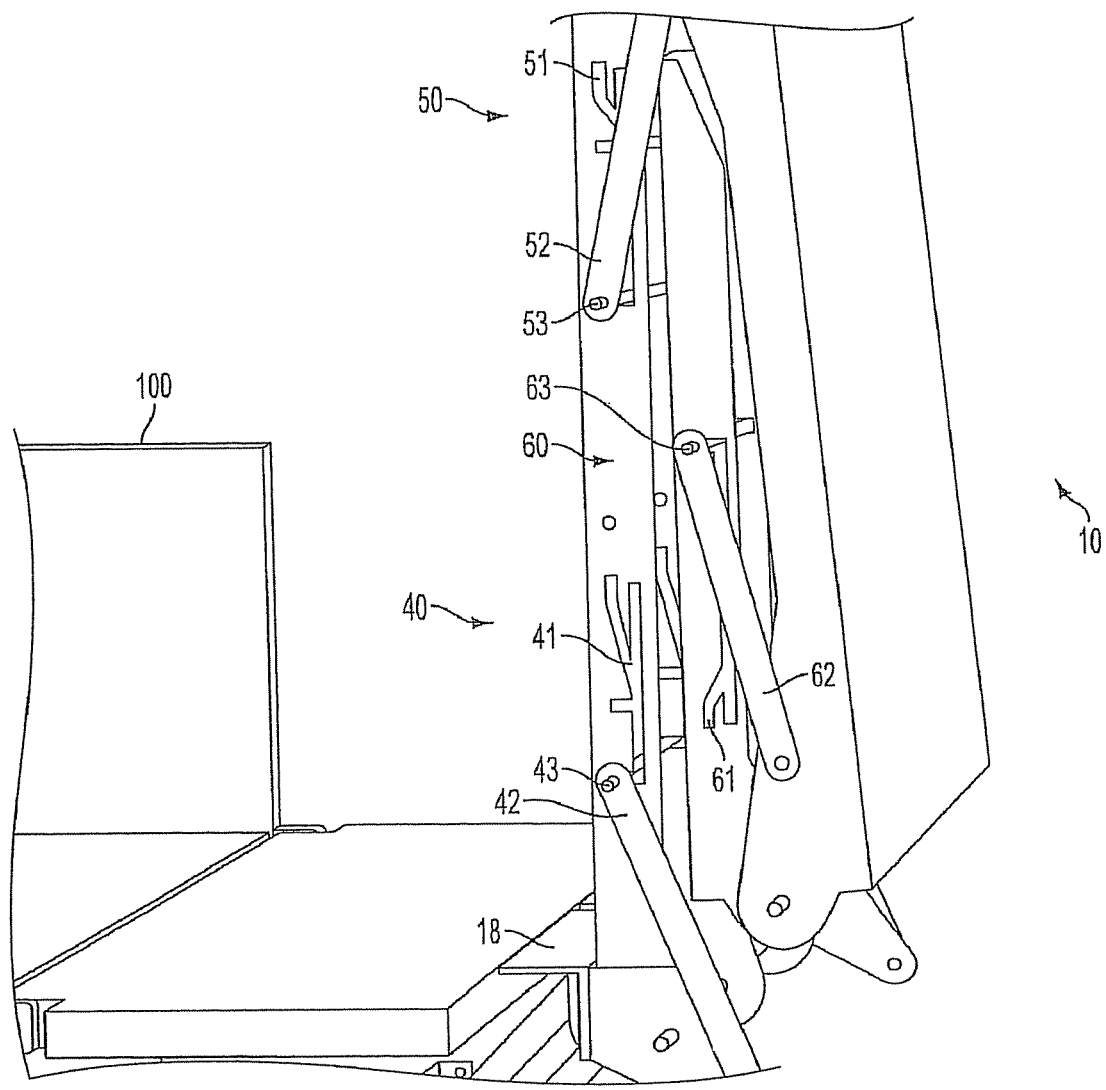
FIG. 9 is an enlarged view of locking mechanisms of an apparatus in the first position in accordance with disclosed embodiments.

FIG. 8 is a side view of the apparatus 10 in the first position, and FIG. 9 is an enlarged view of the locking mechanisms 40, 50, 60 of the apparatus 10 in the first position. It is to be understood that the locking mechanisms 40, 50, 60 shown and described herein can be in the same positions when the apparatus 10 is in both the transporting position (FIG. 3) and the first position (FIG. 7).

The apparatus 10 can include first, second, and third locking mechanisms 40, 50, and 60. The first locking mechanism 40 can be associated with the rotatable connection between the support mechanism 18 and the first section 12, the second locking mechanism 50 can be associated with the rotatable connection between the first section 12 and the second section 14, and the third locking mechanism 60 can be associated with the rotatable connection between the second section 14 and the third section 16.

Each locking mechanism 40, 50, and 60 can include at least a left track 41, 51, 61, a right track 41', 51', 61', a guiding lever 42, 52, 62, and a rod 43, 53, 63. The tracks 41, 41', 51, 51', 61 and 61' can be irregularly shaped and have at least first and second locking positions along the length thereof. The shape of each set of tracks 41 and 41', 51, and 51', and 61 and 61' can be virtually identical to one another. However, the tracks of the first locking mechanism 40 need not be identical to the tracks of the second locking mechanism 50 or the third locking mechanism 60.

For example, the tracks 41 and 41' of the first locking mechanism 40 can include at least first and second locking positions, a loading lock position, and a trailing lock position along the length of the tracks 41 and 41'. The tracks 51 and 51' of the second locking mechanism 50 can include at least first and second locking positions, a loading lock position, and a trailing lock position along the length of the tracks 51 and 51'. The tracks 61 and 61' of the third locking mechanism 60 can include at least a first locking position, a second lock position, and a trailing lock position along the length of the tracks 61 and 61'. The second lock position of the third locking mechanism 60 can also be a loading lock position.

When the rods 43, 53, 63 are situated in a particular locking position of the tracks 41, 41' 51, 51', 61, 61' the apparatus 10 can be secured in the position associated with that locking position. A user can engage the guiding levers 42, 52, 62 to dislodge the rods 43, 53, 63 from the locking positions along the tracks 41, 41' 51, 51', 61, 61'.

The weight of the first, second, and third sections 12, 14, and 16 can cause the rods 43, 53, 63 to move into the next locking position that the rods 43, 53, 63 pass as they move along the tracks 41, 41', 51, 51', 61, 61'. The rods 43, 53, 63 can be associated with springs so that the rods 43, 53, 63 move from a locking position and further along the tracks 41, 41', 51, 51', 61, 61' only when the user engages the guiding levers 42, 52, 62 to do so.

The rods 43, 53, 63 can extend from the tracks 41, 51, 61 on the left side of the apparatus 10 to the tracks 41', 51', 61' on the right side of the apparatus 10. Engaging the guiding lever 42, 52, 62 on one side of the apparatus 10 causes the rods 43, 53, 63 to move along both the tracks 41, 51, 61 and the tracks 41', 51', 61'.

As seen in FIG. 9, when the apparatus 10 is in its first position, the first rod 43 of the first locking mechanism 40 can be in a first locking position, the second rod 53 of the second locking mechanism 50 can be in a first locking position, and the third rod 63 of the third locking mechanism 60 can be in a first locking position.

Figure 10:
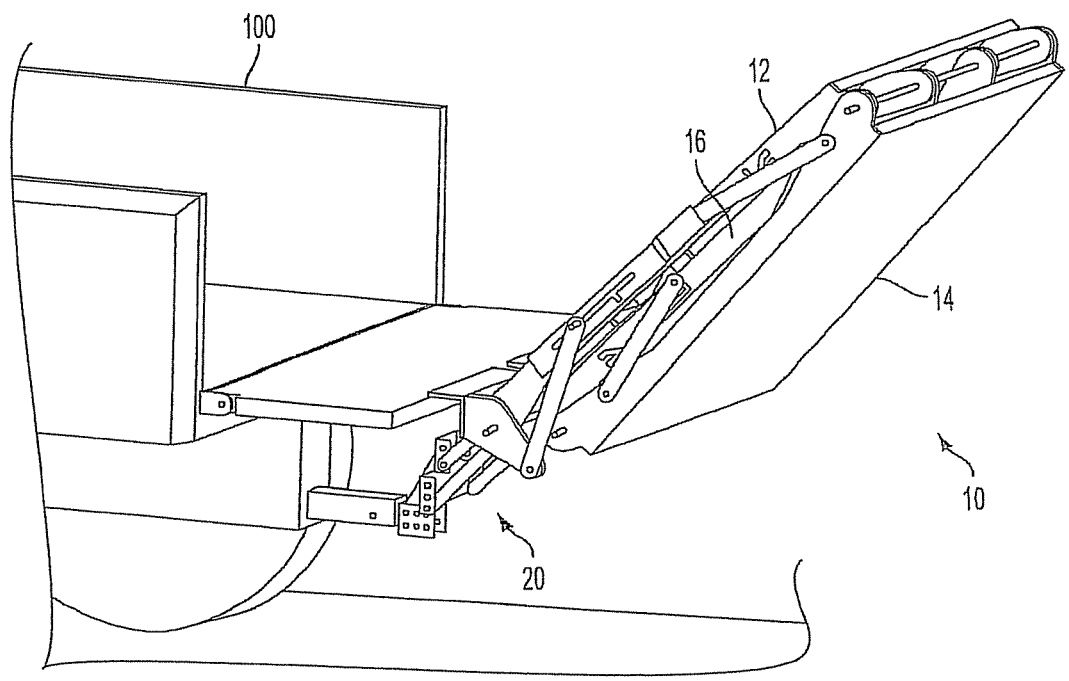
FIG. 10 is a perspective view of an apparatus in a second position in accordance with disclosed embodiments.
Figure 11:
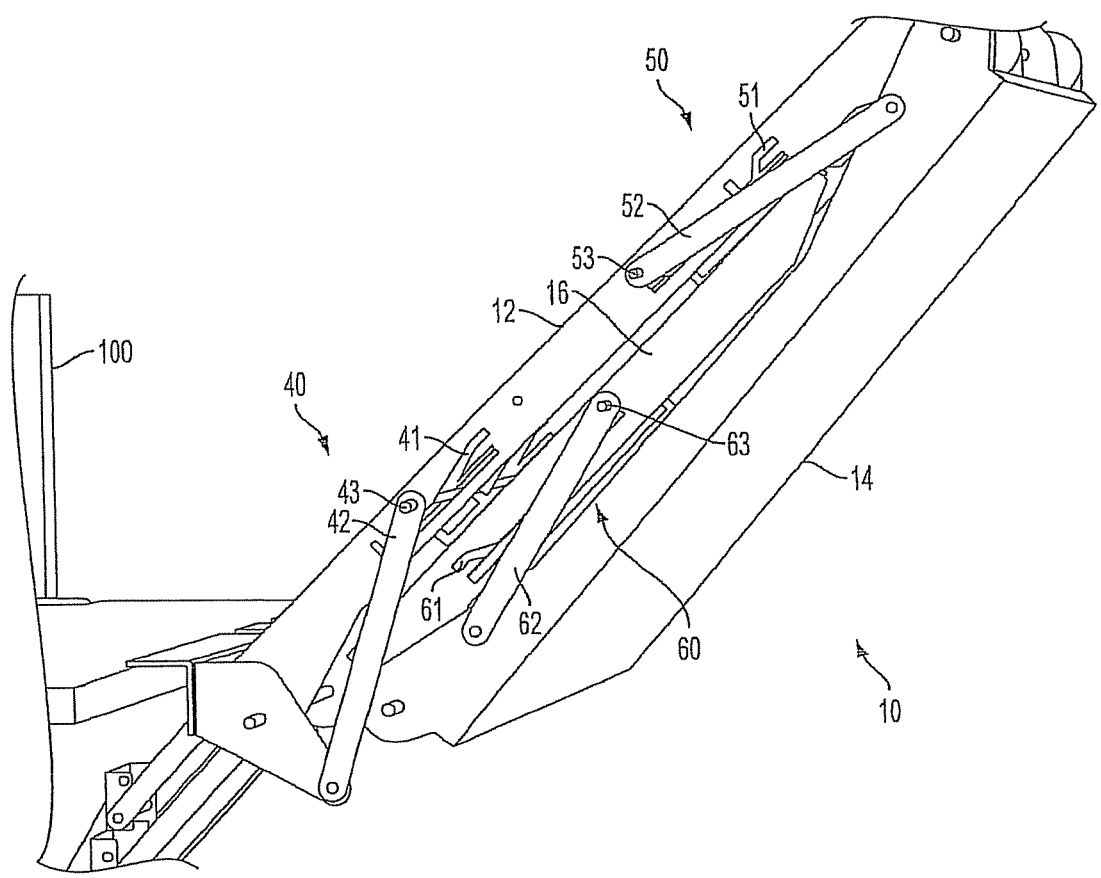
FIG. 11 is an enlarged view, of locking mechanisms of an apparatus in the second position in accordance with disclosed embodiments.

FIG. 10 is a perspective view of the apparatus 10 in a second position, and FIG. 11 is an enlarged view of the locking mechanisms 40, 50, and 60 in the second position. As seen in FIG. 10, when the apparatus 10 is in the second position, the first section 12 can be at an approximately 45° angle relative to the support mechanism 18.

As seen in FIG. 11, when the apparatus 10 is in the second position, the first rod 43 of the first locking mechanism 40 can be in a second locking position along the track 41. However, the second rod 53 of the second locking mechanism 50 can still be in the first locking position as in FIG. 9, and the third rod 63 of the third locking mechanism 60 can still be in the first locking mechanism as in FIG. 9. The connections between the first section 12 and the second section 14, and between the second section 14 and the third section 16 need not move when the apparatus 10 moves from the first position to the second position. Accordingly, the second and third locking mechanisms 50 and 60 need not move as the apparatus 10 moves from the first position to the second position.

Figure 12:
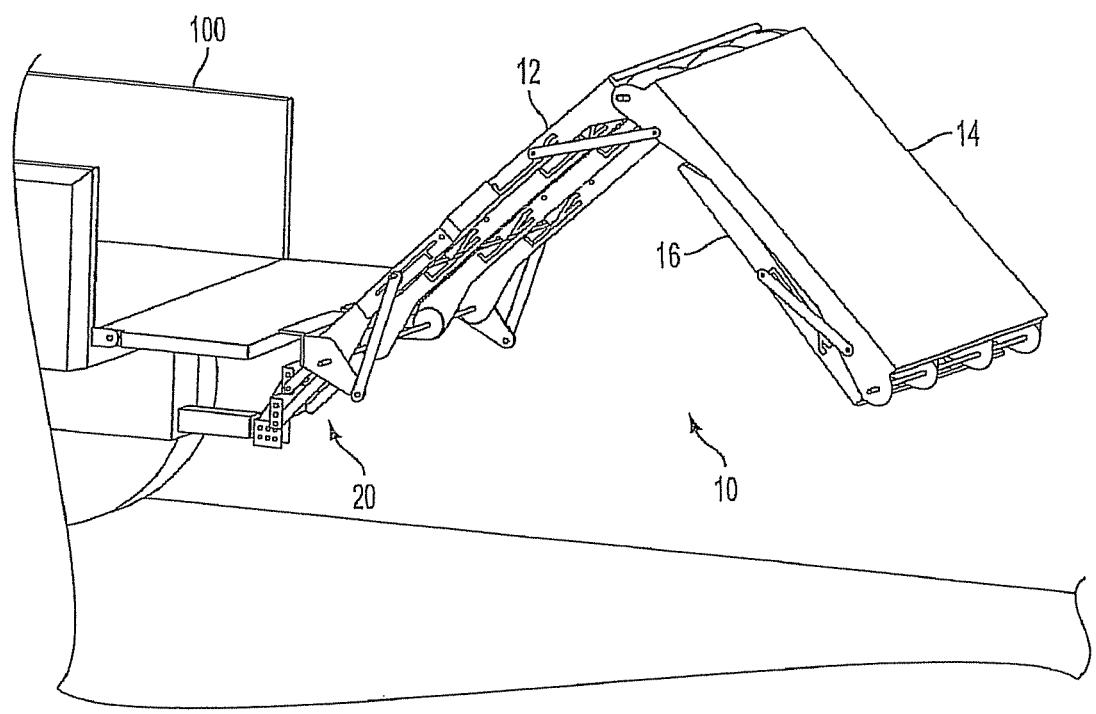
FIG. 12 is a perspective view of an apparatus in a third position in accordance with disclosed embodiments.
Figure 13:
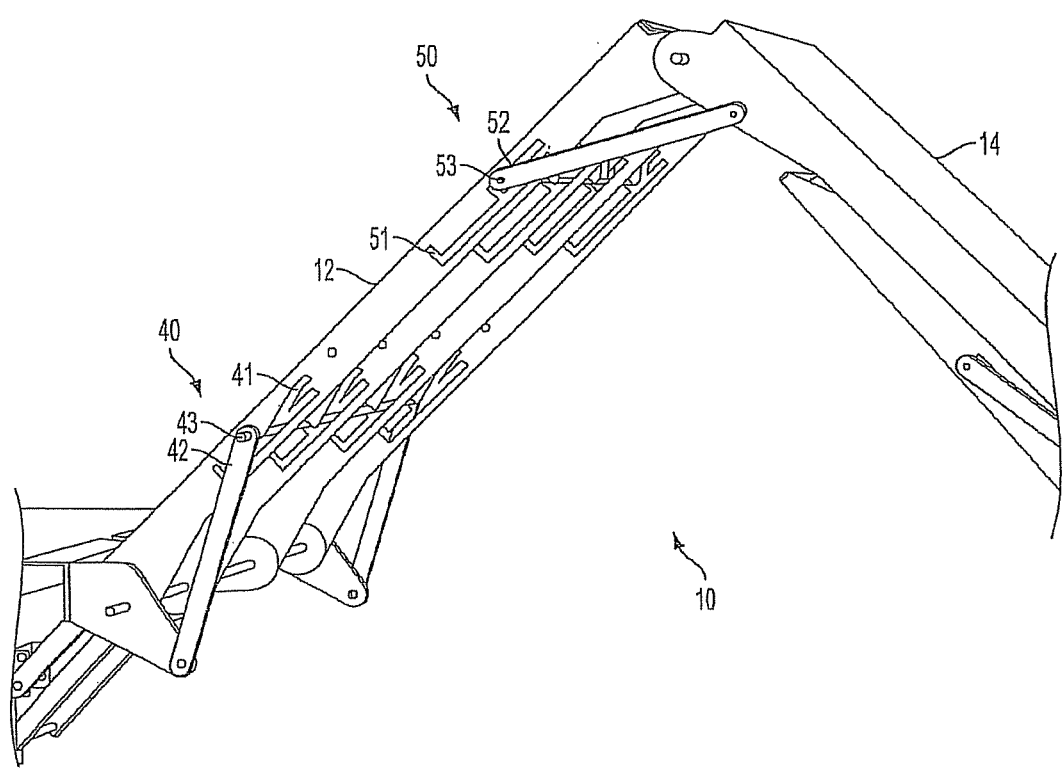
FIG. 13 is an enlarged view of locking mechanisms of an apparatus in the third position in accordance with disclosed embodiments.

FIG. 12 is a perspective view of the apparatus 10 in a third position, and FIG. 13 is an enlarged view of the first and second locking mechanisms 40 and 50 of the apparatus 10 in the third position. As seen in FIG. 12, when the apparatus 10 is in the third position, the first section can still be at an approximately 45° angle relative to the support mechanism 18. However, the second section 14 can also be at an approximately 45° angle relative to the first section 12.

As seen in FIG. 13, when the apparatus 10 is in the third position, the first rod 43 of the first locking mechanism 40 can still be in the second locking position along the track 41. However, the second rod 53 of the second locking mechanism 50 can be in the second locking position along the track 52. The third rod 63 of the third locking mechanism 60 can still in the first locking mechanism as in FIG. 9. The connection between the second section 14 and the third section 16 need not move when the apparatus 10 moves from the second position to the third position. Accordingly, the third locking mechanism 60 need not move as the apparatus 10 moves from the second position to the third position.

Figure 14:
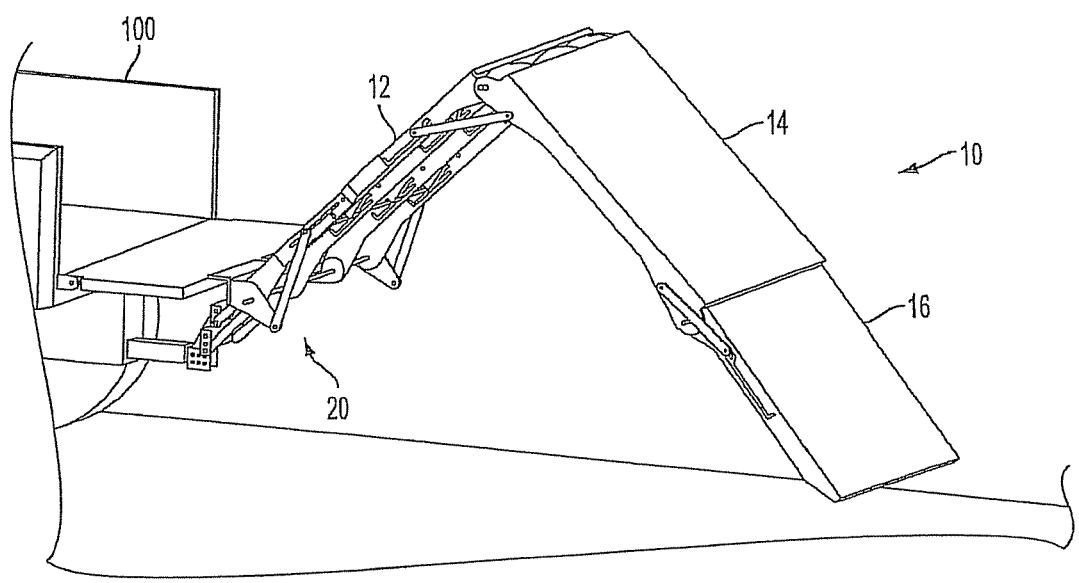
FIG. 14 is a perspective view of an apparatus in a fourth position in accordance with disclosed embodiments.

FIG. 14 is a perspective view of the apparatus 10 in a fourth position. As seen in FIG. 14, when the apparatus 10 is in the fourth position, the first section 12 can still be at an approximately 45° angle relative to the support section 18, and the second section 14 can still be at an approximately 45° angle relative to the first section 12. However, the third section 16 can be at an angle relative to the second section 14 that is between approximately 90° and approximately 180°. In preferred embodiments, when the apparatus 10 is in the fourth position, the third section 16 is at an angle relative to the second section 14 that is between approximately 130° and approximately 170°.

When the apparatus 10 is in the fourth position, the first rod 43 of the first locking mechanism 40 can still be in the second locking position along the track 41, and the second rod 53 of the second locking mechanism 50 can still be in the second locking position along the track 52. However, the third rod 63 of the third locking mechanism 60 can be in the second locking position along the track 61. The connections between support mechanism 18 and the first section 12 and between the first section 12 and the second section 14 need not move when the apparatus 10 moves from the third position to the fourth position. Accordingly, the first and second locking mechanisms 40 and 50 need not move as the apparatus 10 moves from the third position to the fourth position.

Figure 15:
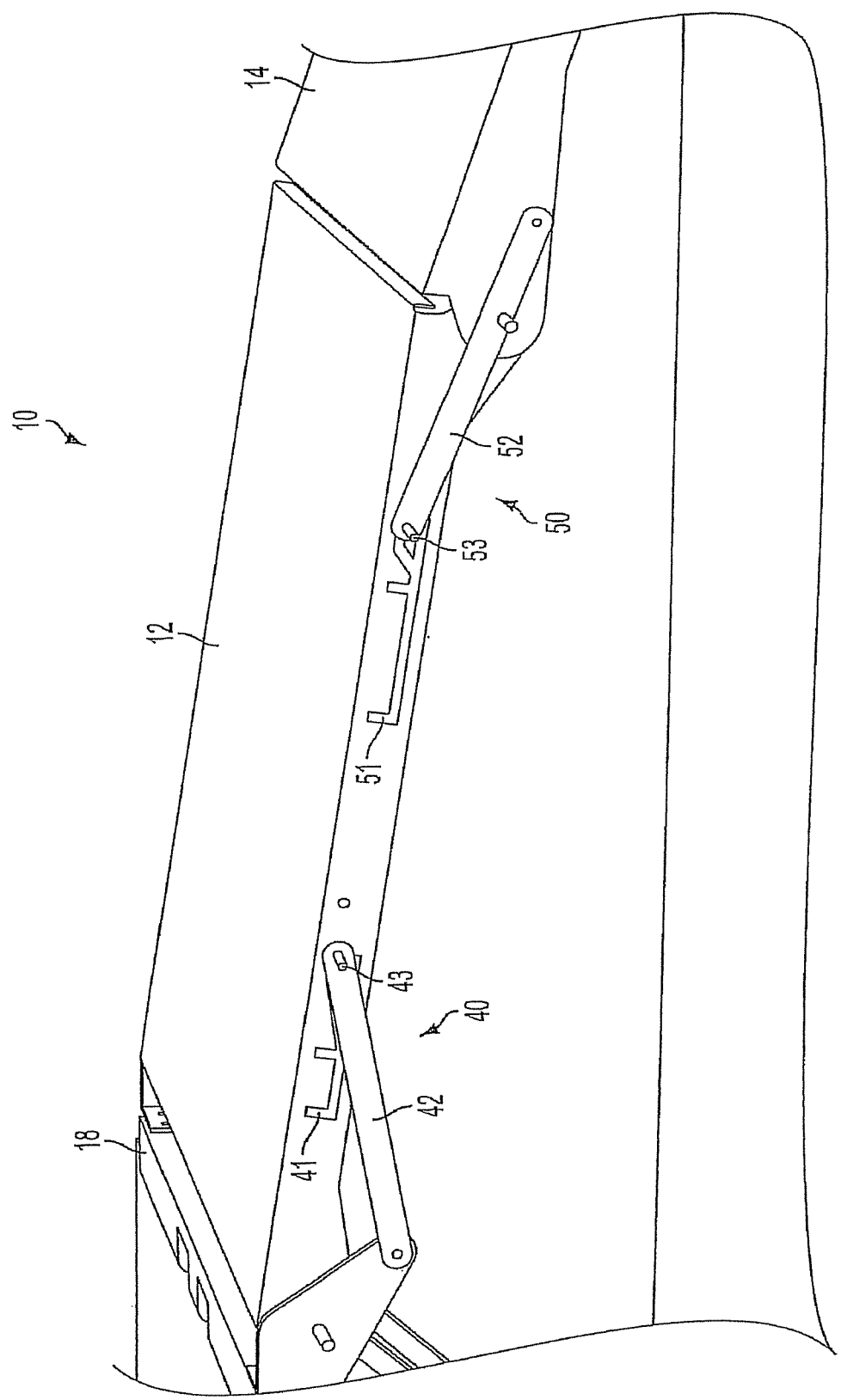
FIG. 15 is an enlarged view of first and second locking mechanisms of an apparatus in the loading position in accordance with disclosed embodiments.

From the fourth position, the apparatus 10 can be moved to the loading position as seen in FIG. 1. FIG. 15 is an enlarged view of the first and second locking mechanisms 40 and 50 of the apparatus 10 in the loading position. When the apparatus 10 is in the loading position, the first rod 43 of the first locking mechanism 40 can be in a loading lock position along the track 41, and the second rod 53 of the second locking mechanism 50 can be in a loading lock position along the track 52. The third rod 63 of the third locking mechanism 60 can still be in the second locking position along the track 61.

Figure 16:
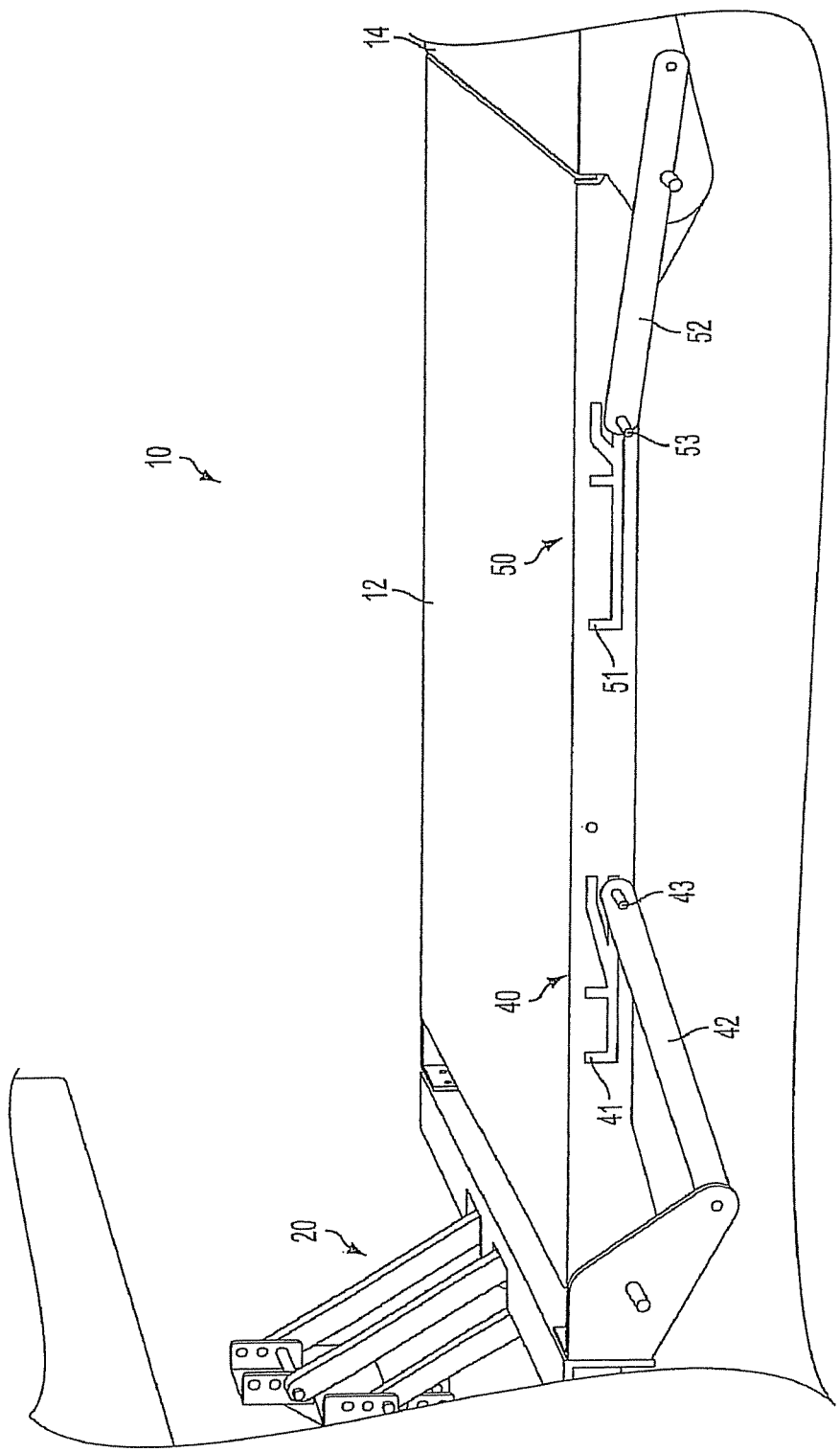
FIG. 16 is an enlarged view of first and second locking mechanisms of an apparatus in the trailing position in accordance with disclosed embodiments.
Figure 17:
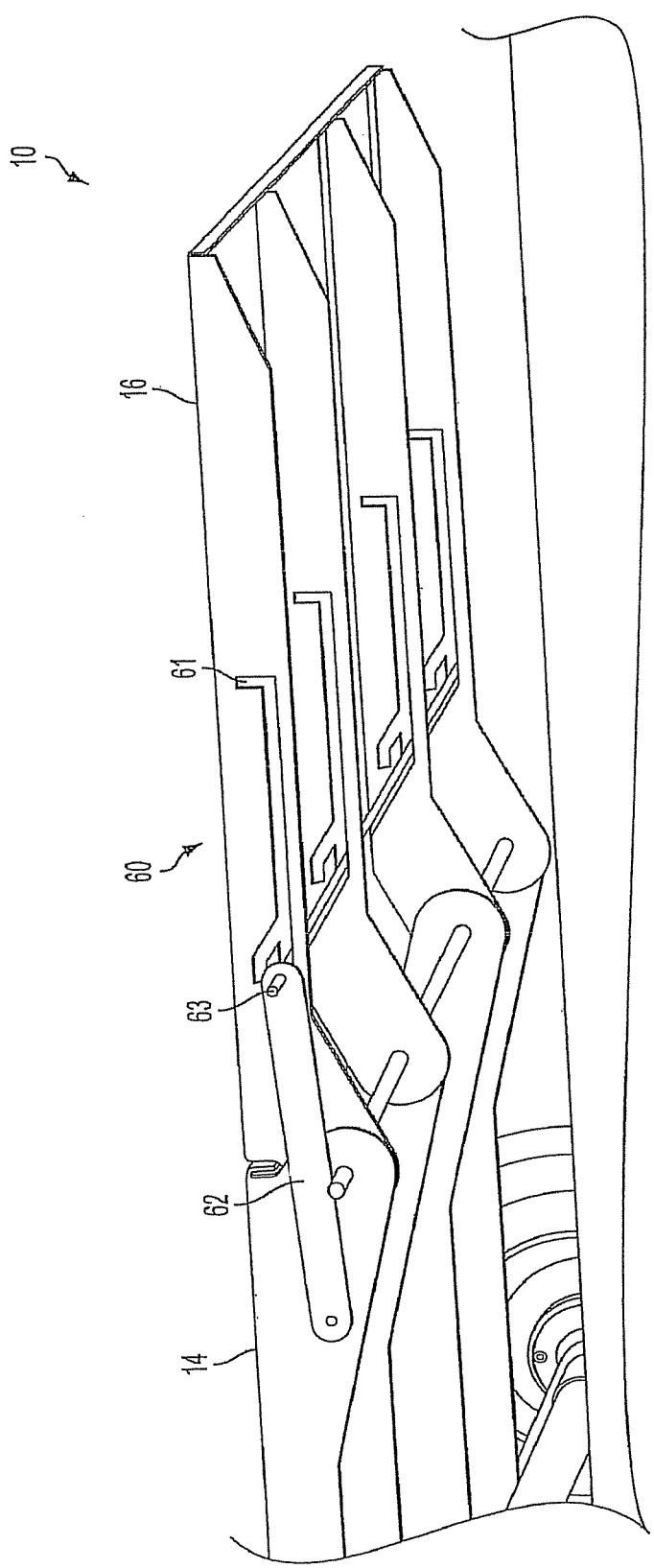
FIG. 17 is an enlarged view of a third locking mechanism of an apparatus in the trailing position in accordance with disclosed embodiments.

From the loading position, the apparatus 10 can be moved to the trailing position as seen in FIG. 2. FIG. 16 is an enlarged view the first and second locking mechanisms 40 and 50 of the apparatus 10 in the trailing position, and FIG. 17 is an enlarged view of the third locking mechanism 60 of the apparatus 10 in the trailing position. When the apparatus 10 is in the trailing position, the first rod 43 of the first locking mechanism 40 can be in a trailing lock position along the track 41, and the second rod 53 of the second locking mechanism 50 can be in a trailing lock position along the track 51. The third rod 63 of the third locking mechanism 60 can be in a trailing lock position along the track 61.

In some embodiments, the connections between the support mechanism 18 and the first section 12, between the first section 12 and the second section 14, and between the second section 14 and the third section 16 can be spring loaded such that kinetic energy applied to the springs associated with these connections can be used to assist a user in moving the apparatus 10 from the transporting position to the first position, second position, third position, fourth position, loading position, and trailing position.

As will be understood by persons having ordinary skill in the art, springs can be associated with the rotatable connections of the apparatus 10 to counter the weight/mass of the first 12, second 14, and third sections 16. In this manner, the movement of these parts can be controlled. In accordance with disclosed embodiments, coil springs, leaf springs, or any other type of spring can be used. In further embodiments, electronic compression and release devices can be incorporated to automate the apparatus 10 of disclosed embodiments.

The Material of the Apparatus

Some or all parts of the apparatus 10 in accordance with the disclosed embodiments can be made from metal, steel, aluminum, plastic, or any other material as would be known by those of ordinary skill in the art. In some embodiments, the apparatus 10 can be made from a combination or hybrid of various materials.

In some embodiments, the first 12, second 14, and/or third sections 16 of the apparatus 10 can be made of a solid sheet of material, as seen in FIG. 1 and FIG. 2, for example. In other embodiments, the first 12, second 14, and third sections 16 can include a support grid. A mesh material can overlay the support grid or be situated in the openings of the support grid. Incorporation of a support grid and mesh material can maximize the strength of the apparatus 10 while minimizing the weight of the apparatus 10. In any embodiment, the apparatus can be strong enough to support multiple vehicles, for example, motorcycles thereon.

Figure 18:
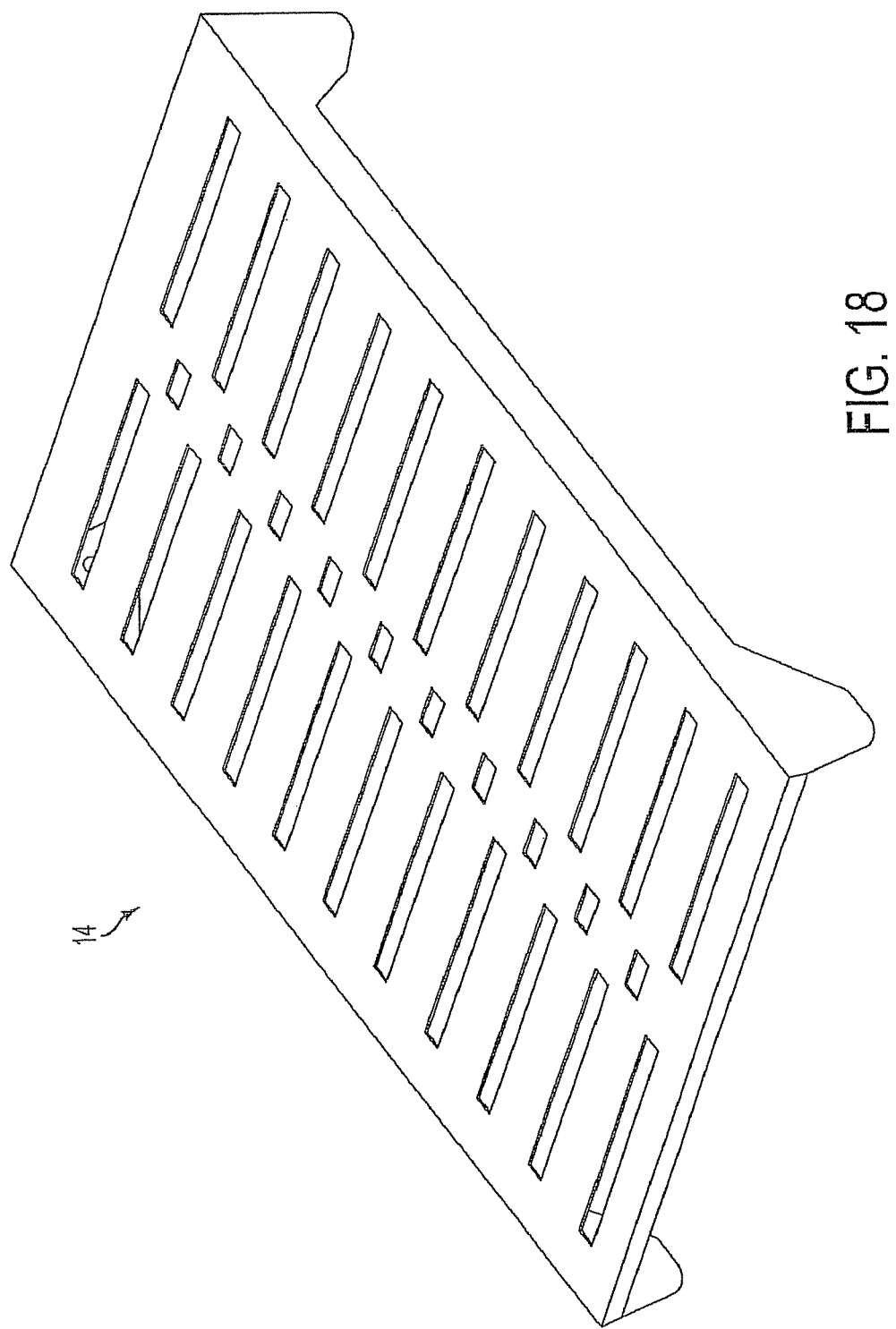
FIG. 18 is a perspective view of a second section of an apparatus with rectangular cut outs therethrough in accordance with disclosed embodiments.
Figure 19:
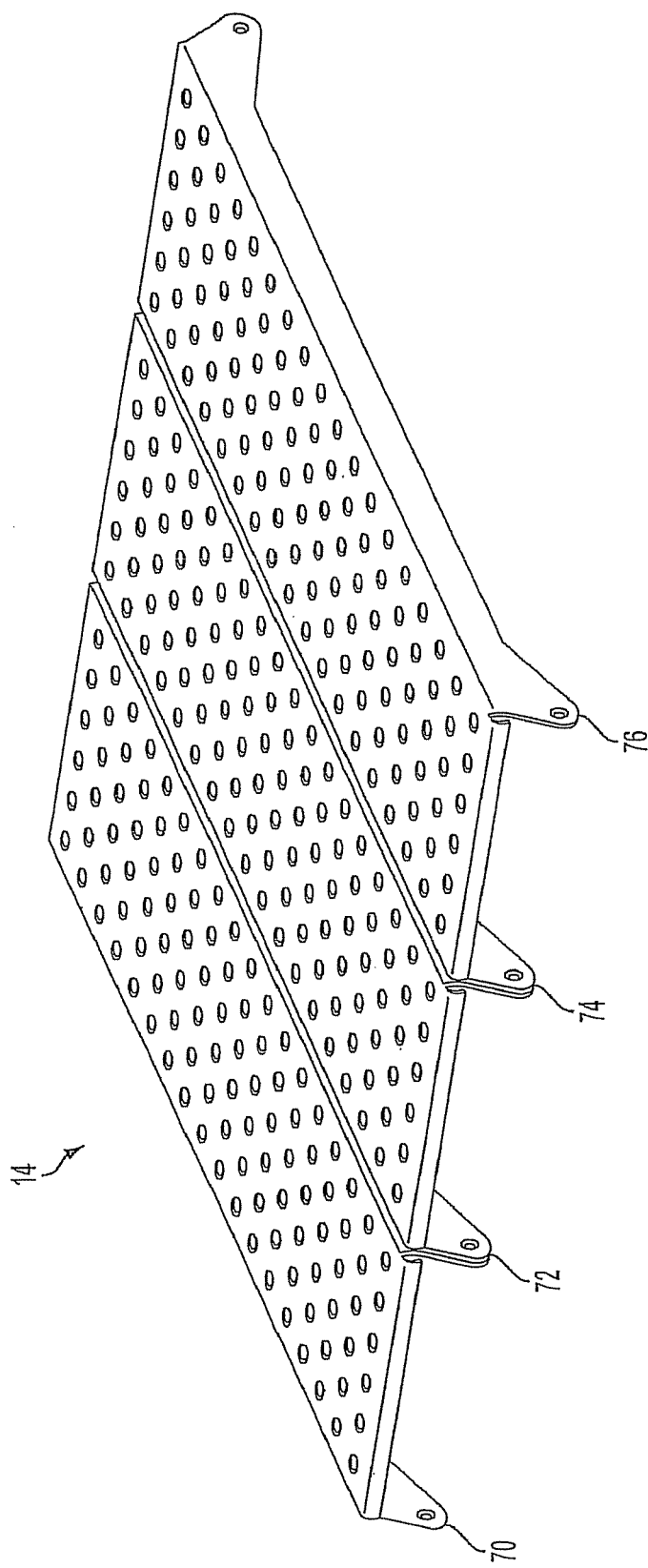
FIG. 19 is a perspective view of a second section of an apparatus with ovular cut outs therethrough in accordance with disclosed embodiments.

In some embodiments, the first, 12, second 14, and/or third sections 16 of the apparatus 10 can be made of a material with rectangular cut outs therethrough. In still other embodiments, the first 12, second 14, and/or third sections 16 of the apparatus 10 can be made of a material with ovular cutouts therethrough. FIG. 18 is, a perspective view of the second section 14 of the apparatus with rectangular cut outs therethrough, and FIG. 19 is a perspective view of the second section 14 with ovular cut outs therethrough. In the embodiments seen in FIG. 18 and FIG. 19, the solid material maximizes the strength of the apparatus while the cut outs minimize the weight of the apparatus.

As can be seen in FIG. 19, the first 12, second 14, and/or third sections 16 of the apparatus 10 can include reinforcement mechanisms on the bottom sides thereof. The reinforcement mechanisms can be located at predetermined distances across the width of the apparatus 10 to provide even greater strength to the apparatus.

Figure 20:
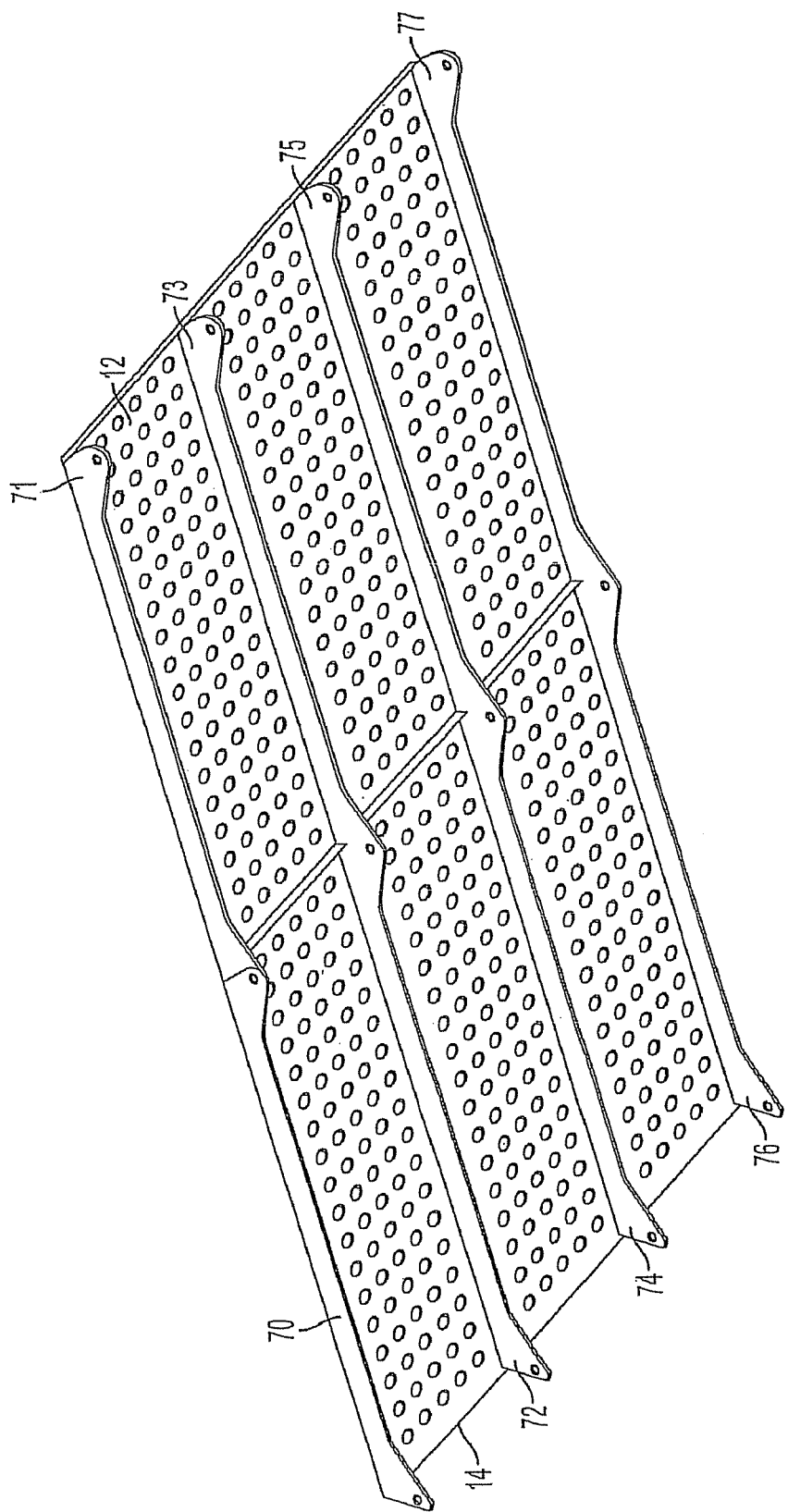
FIG. 20 is a bottom perspective view of first and second sections of an apparatus with reinforcement mechanisms in accordance with disclosed embodiments.

FIG. 20 is a bottom perspective view of the first and second sections 12 and 14 of the apparatus 10. As can be seen in FIG. 20, the reinforcement mechanisms 70, 72, 74, 76 associated with the second section 14 can be rotatably connected to the reinforcement mechanisms 71, 73, 75, 77 of the first section 12.

Figure 21:
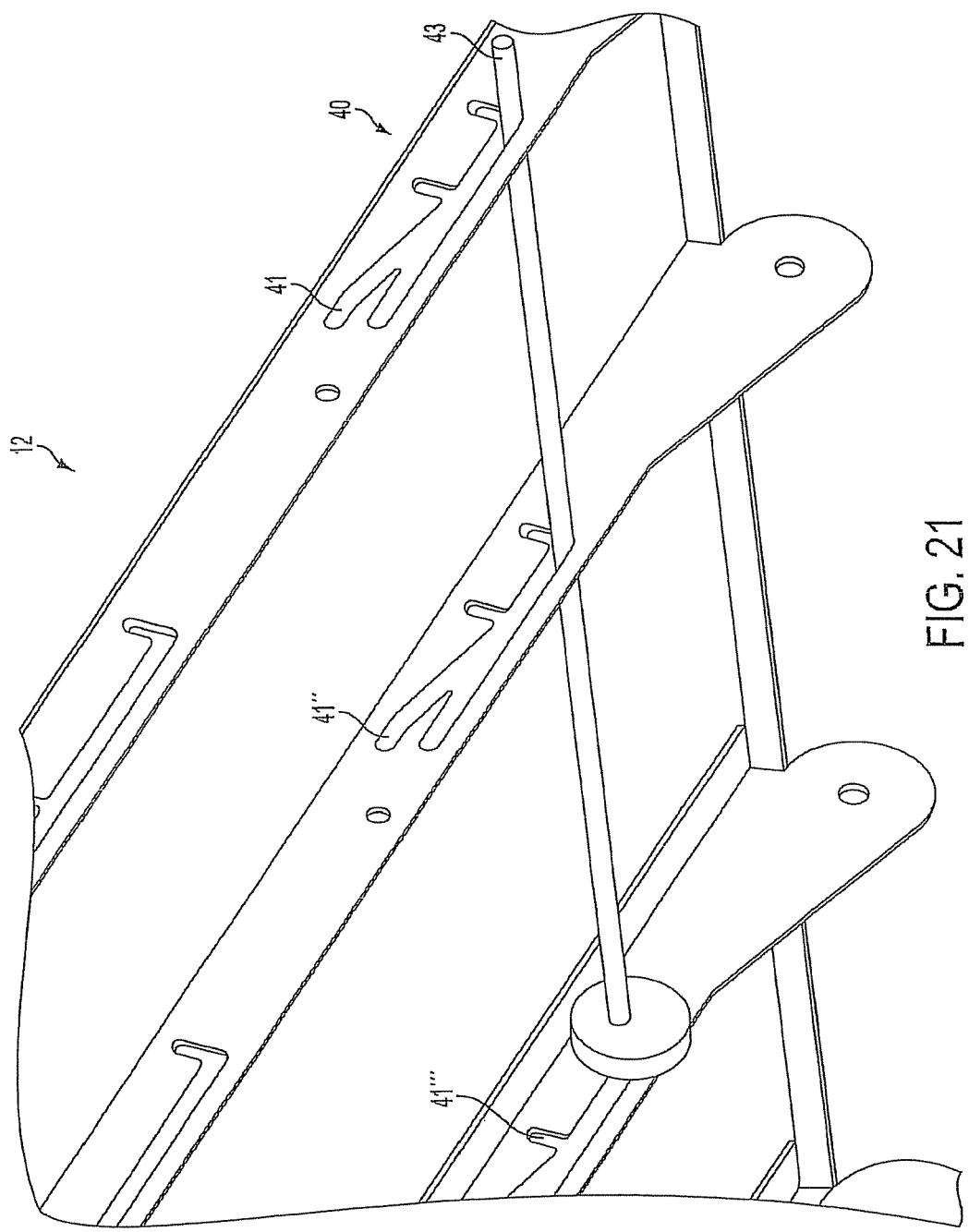
FIG. 21 is a bottom perspective view of reinforcement mechanisms incorporating locking mechanisms in accordance with disclosed embodiments.

The reinforcement mechanisms 70, 72, 74, 76 associated with the second section 14, for example, can be solid pieces of material, and the reinforcement mechanisms 71, 73, 75, 77 associated with the first section 12 can be pieces of material with elongated grooves extending the length thereof. When the second section 14 is folded into the first section 10, as explained and described above, the reinforcement mechanisms 70, 72, 74, 76 of the second section 14 can fold into the grooves of the reinforcement mechanisms 71, 73, 75, 77 of the first section 12 so that the apparatus 10 fully maintains its folded position. As seen in FIG. 21, each of the reinforcement mechanisms can include tracks so that the rods of the locking mechanisms extend through identical tracks in each reinforcement mechanism.

An Alternate Embodiment of the Hitch Attachment Mechanism

Figure 22:
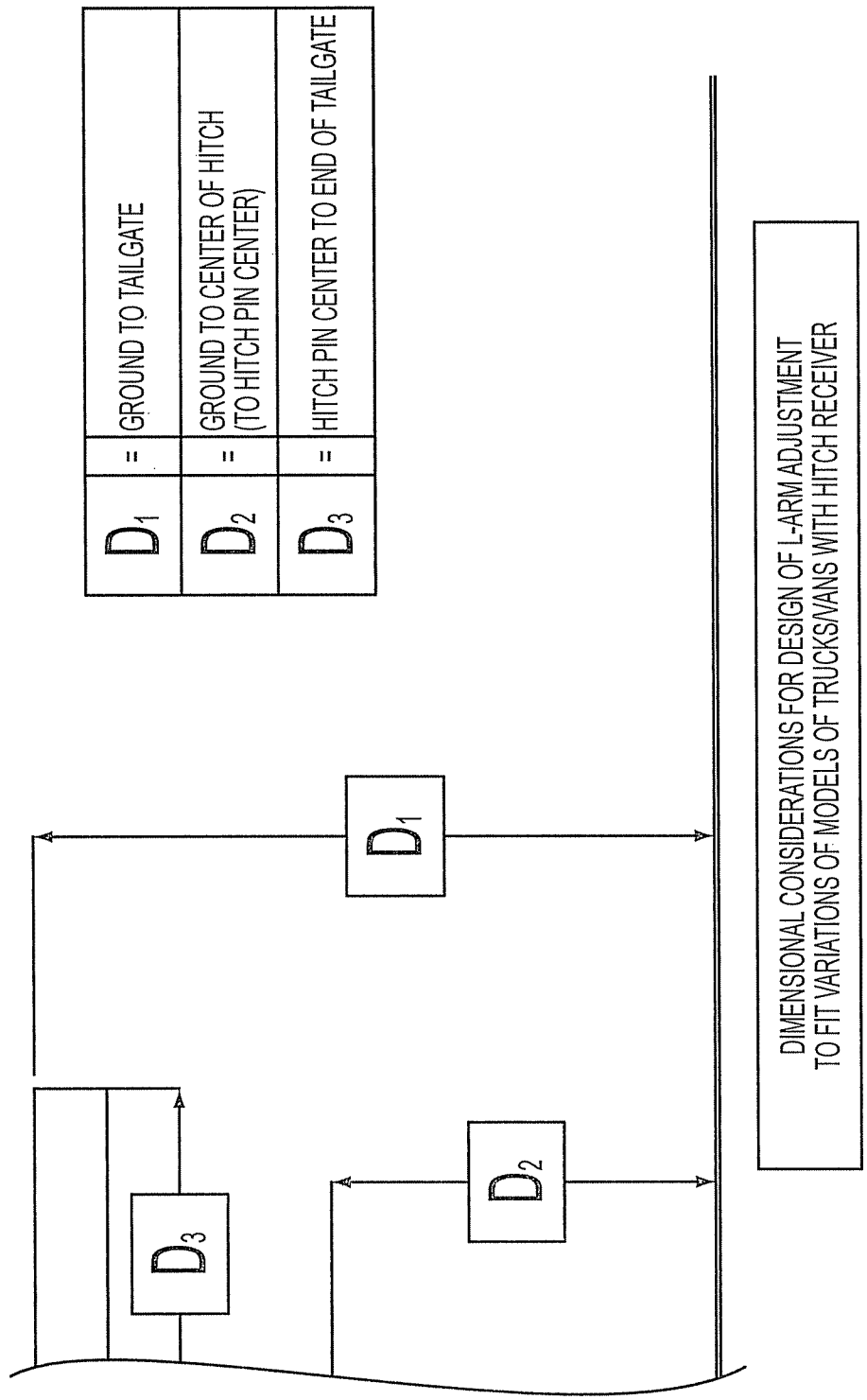
FIG. 22 is a block diagram showing varying dimensions of trucks.

As explained above, the dimensions of trucks and bed doors of trucks can vary. FIG. 22 is a block diagram showing the varying dimensions of trucks. For example, D1 can represent the vertical distance from an open bed door of a truck, i.e. a tailgate, to the ground. D2 can represent the vertical distance from the hitch of a truck to the ground. Finally, D3 can represent the horizontal distance from the hitch of a truck to the distal end of the open bed door, i.e. the end of the tailgate. Each of D1, D2, and D3 can vary in different models of trucks.

Figure 23:
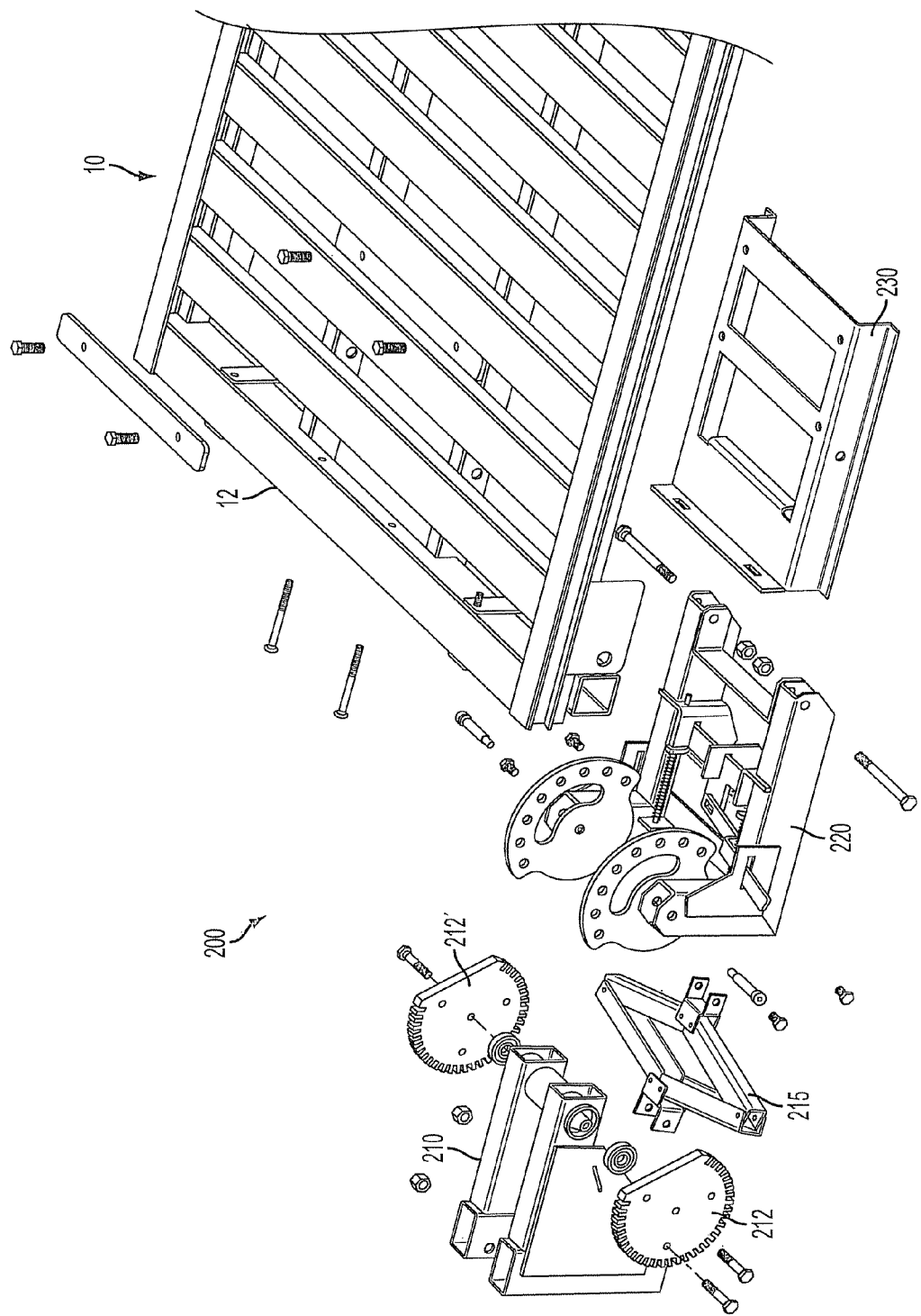
FIG. 23 is an exploded view of a hitch attachment mechanism in accordance with an alternate disclosed embodiment.
Figure 24:
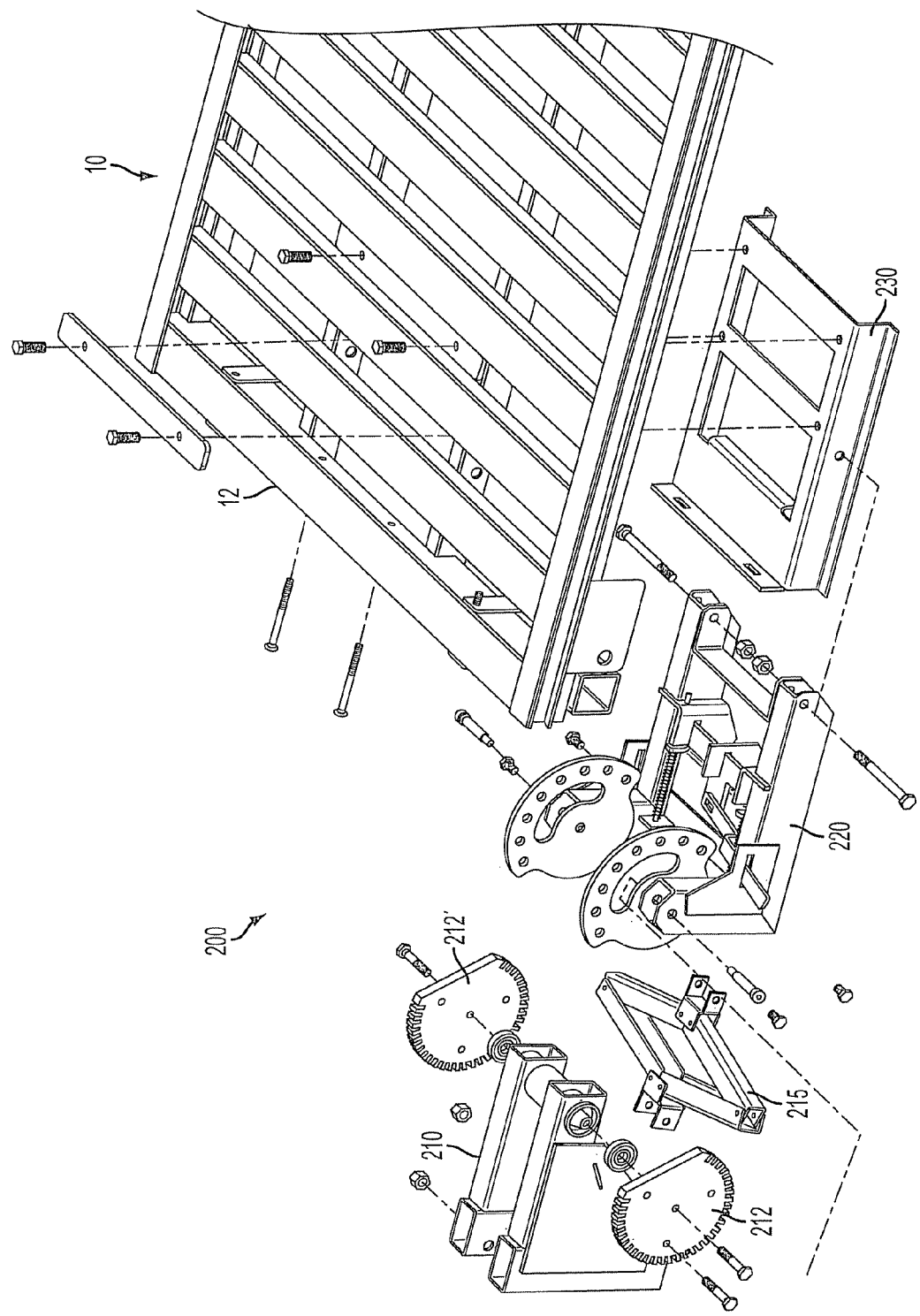
FIG. 24 is an exploded view of the hitch attachment mechanism of FIG. 23 showing connections and connection points between various elements.

To accommodate for the varying dimensions of D1, D2, and D3 in different models of trucks, an alternate embodiment of a hitch attachment mechanism 200 can be employed. FIGS. 23 and 24 are exploded views a hitch attachment mechanism 200 as disclosed herein, and FIG. 24 shows the connections and connection points between the various elements of the mechanism 200. For example, the hitch attachment mechanism 200 can include at least a mainframe 210, a jack 215, an L-arm 220, and a swing arm 230.

The mainframe 210 can be associated with a hitch of a truck as would be known by those of skill in the art. Additionally, the mainframe 210 can include first and second adjustment disks 212, 212' on respective first and second sides thereof. The adjustment disks 212, 212' can be rotatably connected to the mainframe using any type of rotating attachment mechanisms as would be known by those of ordinary skill in the art, for example, nuts, screws, and/or bolts.

The mainframe 210 can be connected to the L-arm 220 with a drive 215, for example, a scissors jack. For example, the drive 215 can be braced between the mainframe 210 and the L-arm 220 so that the drive 215 is in an extended position when the L-arm 220 is in a first (raised) position and in a compressed position when the L-arm is in a second (lowered) position.

The L-arm 220 can also be rotatably connected to the first and second adjustment disks 212, 212' on respective sides of the mainframe 210. As will be explained herein, the L-arm 220 can be adjusted relative to the adjustment disks 212, 212'.

Finally, the swing arm 230 can be connected to the L-arm 220, for example, at a distal end thereof. The swing arm 230 can also be connected to the apparatus 10 described above, for example, the first section 12 of the apparatus 10.

As explained above, the hitch attachment mechanism 200 can accommodate for varying dimensions of D1, D2, and D3 in different models of trucks. For example, the connections between the L-arm 220 and the adjustment disks 212, 212' can be adjusted to accommodate for different dimensions of D1, D2, and D3. In some embodiments, the connections between the L-arm 220 and the disks 212, 212' need only be adjusted once when the mechanism 200 is used in connection with a particular truck. After the one-time adjustment, the L-arm, and accordingly, the mechanism 200, will have the proper connection points to use with the dimensions of the truck.

Figure 25:
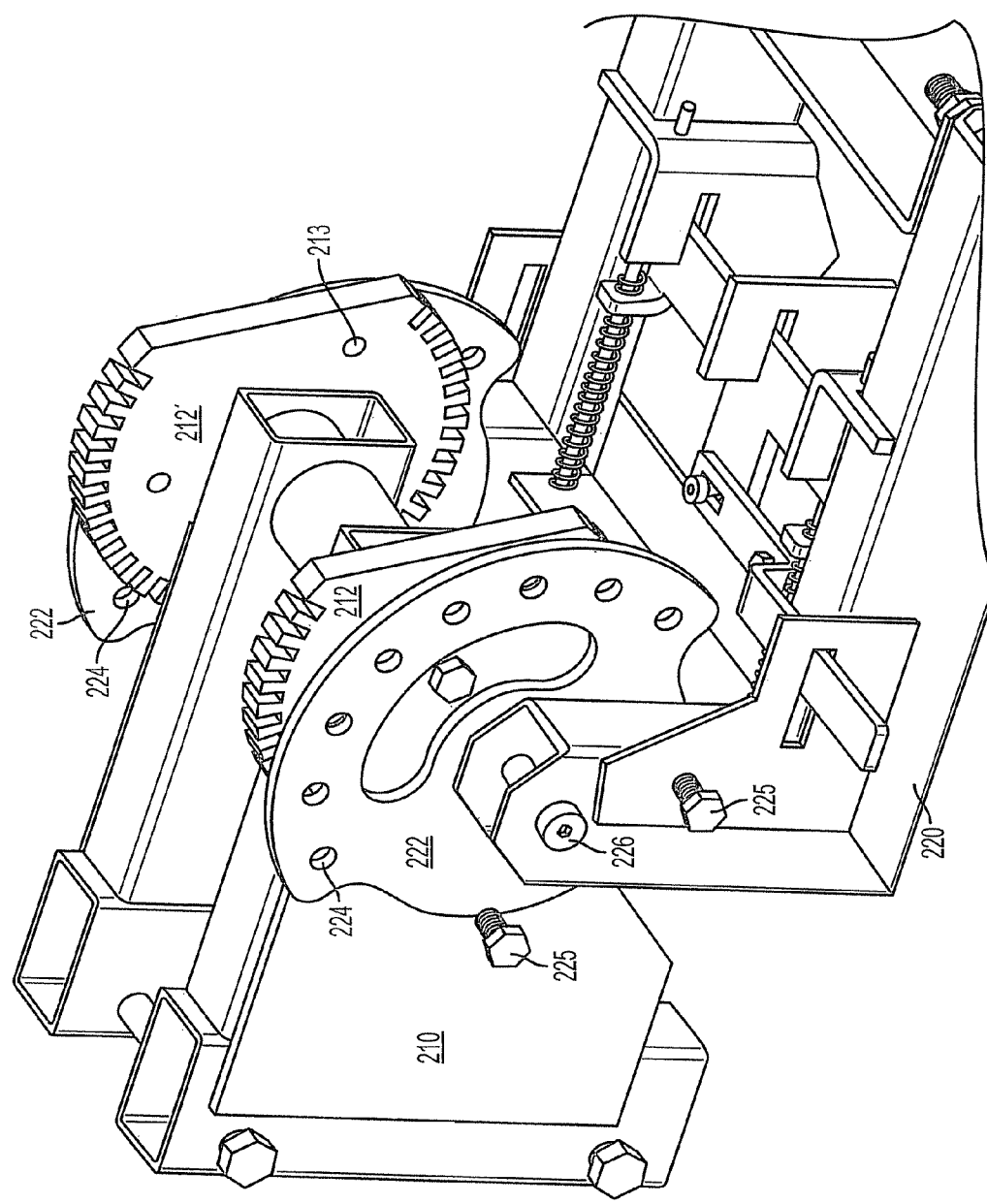
FIG. 25 is a perspective view of the mainframe and L-arm of FIG. 23 with attachment mechanisms removed therefrom.

As seen in FIG. 25, the L-arm 220 can include first and second arced connection members 222 having a plurality of affixation points 224, for example, apertures, for receiving attachment mechanisms 225 as would be understood by those of ordinary skill in the art, for example, a nut, screw, and/or bolt. When the attachment mechanisms 225 are removed from the affixation points 224 of the L-arm 220, the arced connection members 222, and accordingly, the L-arm 220, can be adjusted relative to the mainframe 210 and the respective adjustment disks 212, 212'. The arced connection members 222 can be adjusted until affixation points 224 in the arced connection members 222 are aligned with desired affixation points 213 in the respective adjustment disks 212, 212'.

Figure 26:
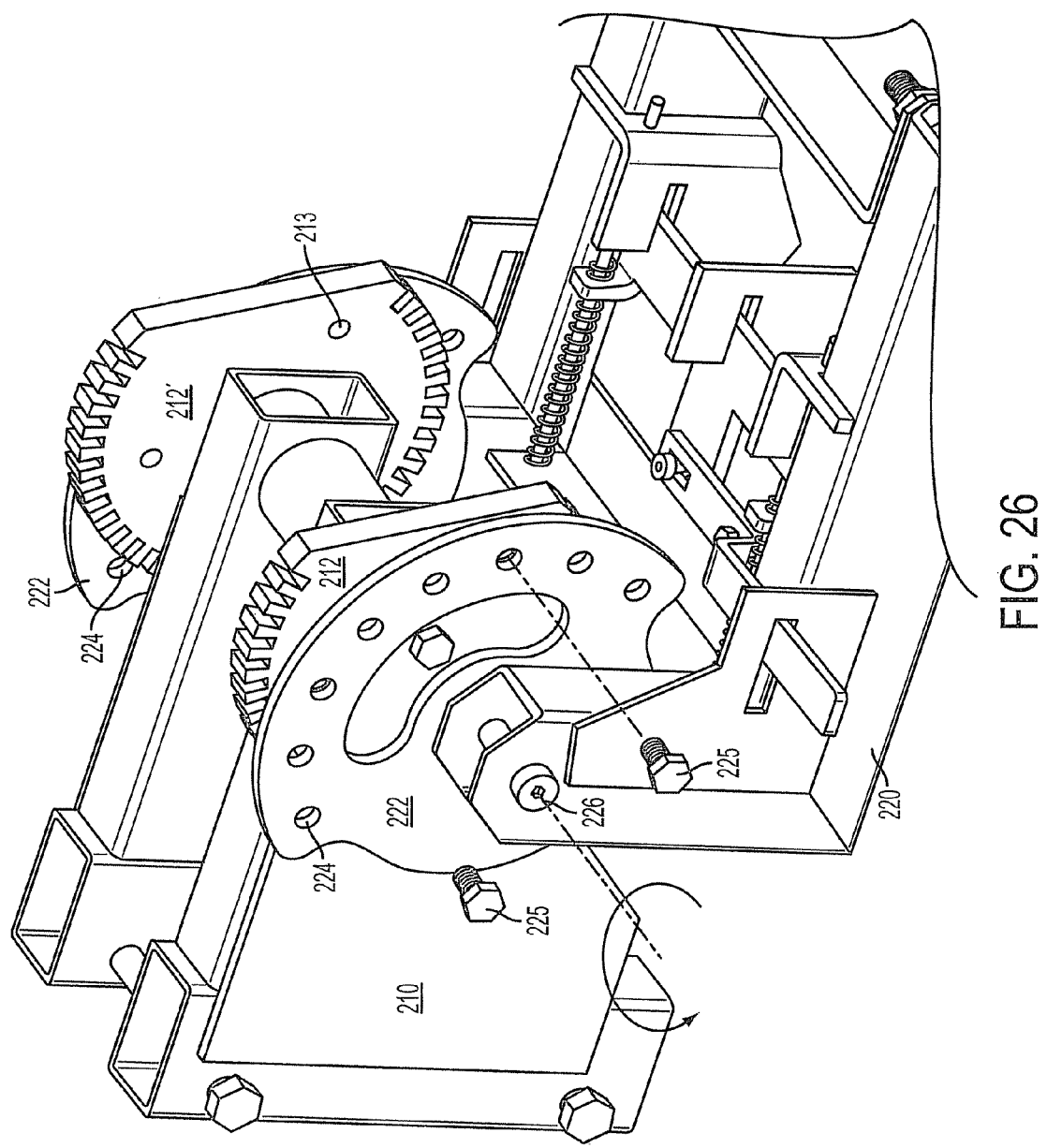
FIG. 26 is a perspective view of the mainframe and L-arm of FIG. 23 showing connections and connection points with attachment mechanisms.
Figure 27:
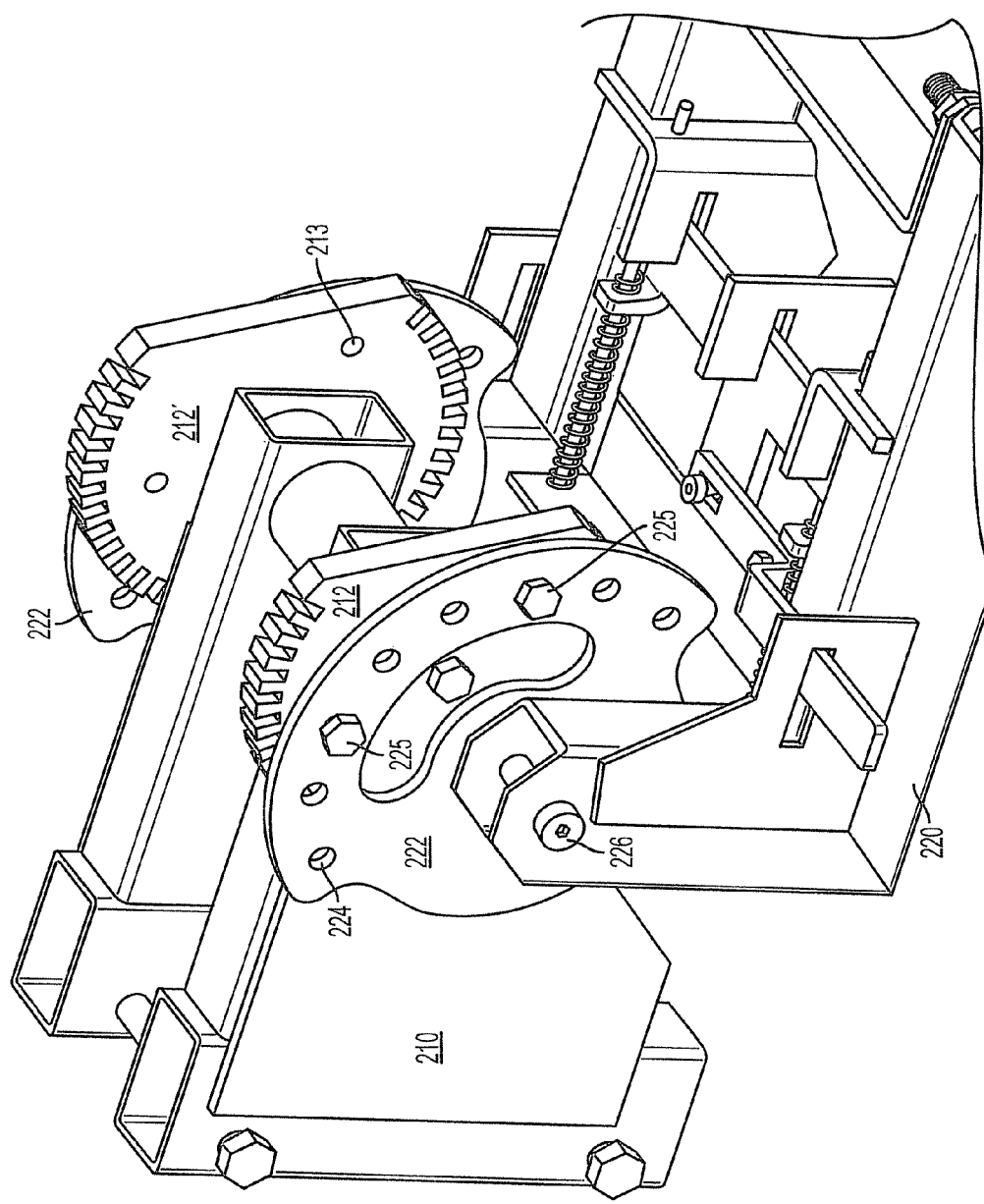
FIG. 27 is a perspective view of the mainframe and L-arm of FIG. 23 with attachment mechanisms affixed thereto.
Figure 28:
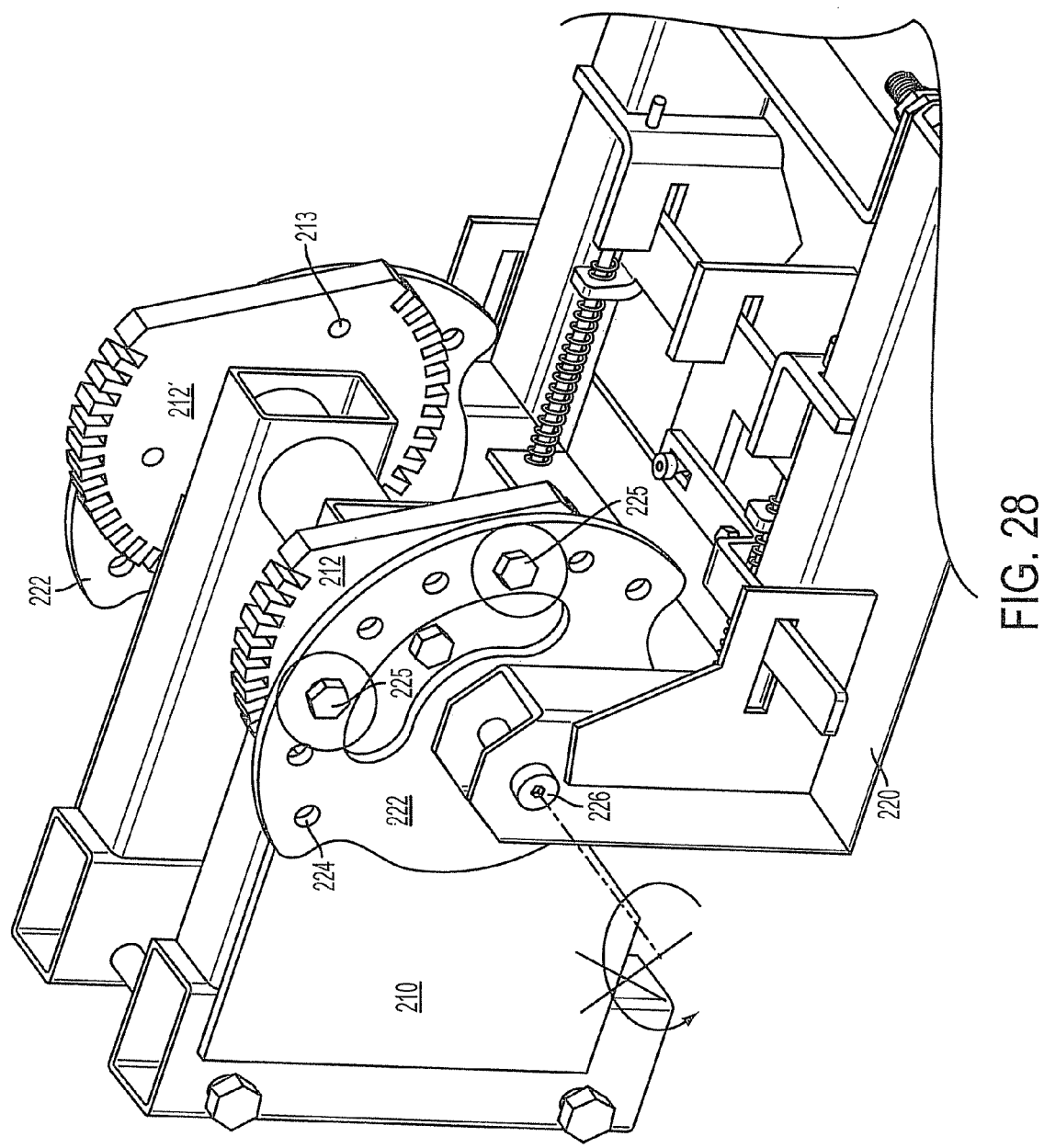
FIG. 28 is a perspective view of the mainframe and L-arm of FIG. 23 showing the effects of the attachment mechanisms affixed thereto.

For example, FIG. 26 shows where and how the attachment mechanisms 225 can connect the arced connection member 222 with the adjustment disks 212, 212'. When the attachment mechanisms 225 are removed from the affixation points 224, 213, the L-arm 220 can rotate about a rotation axis 226. However, when the attachment mechanisms 225 are associated with the affixation points 224, 213 as seen in FIG. 27, the L-arm 220 can be fixed relative to the mainframe 210 and the adjustment disks 212, 212' so that, as seen in FIG. 28, the L-arm 220 does not rotate about the rotation axis 226.

Figure 29:
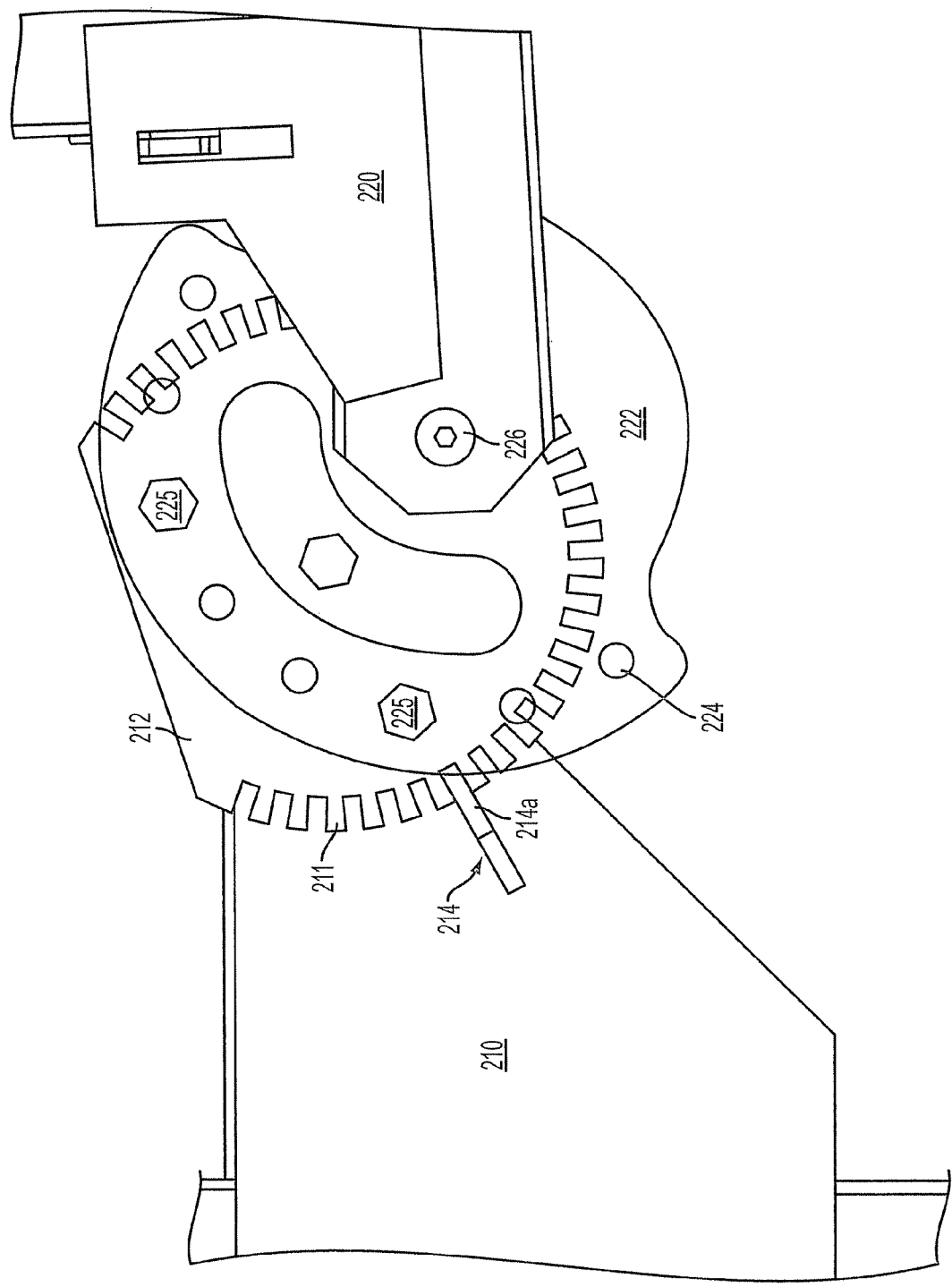
FIG. 29 is a side view of the mainframe and L-arm of FIG. 23 with an associated locking mechanism in an engaged position.
Figure 30:
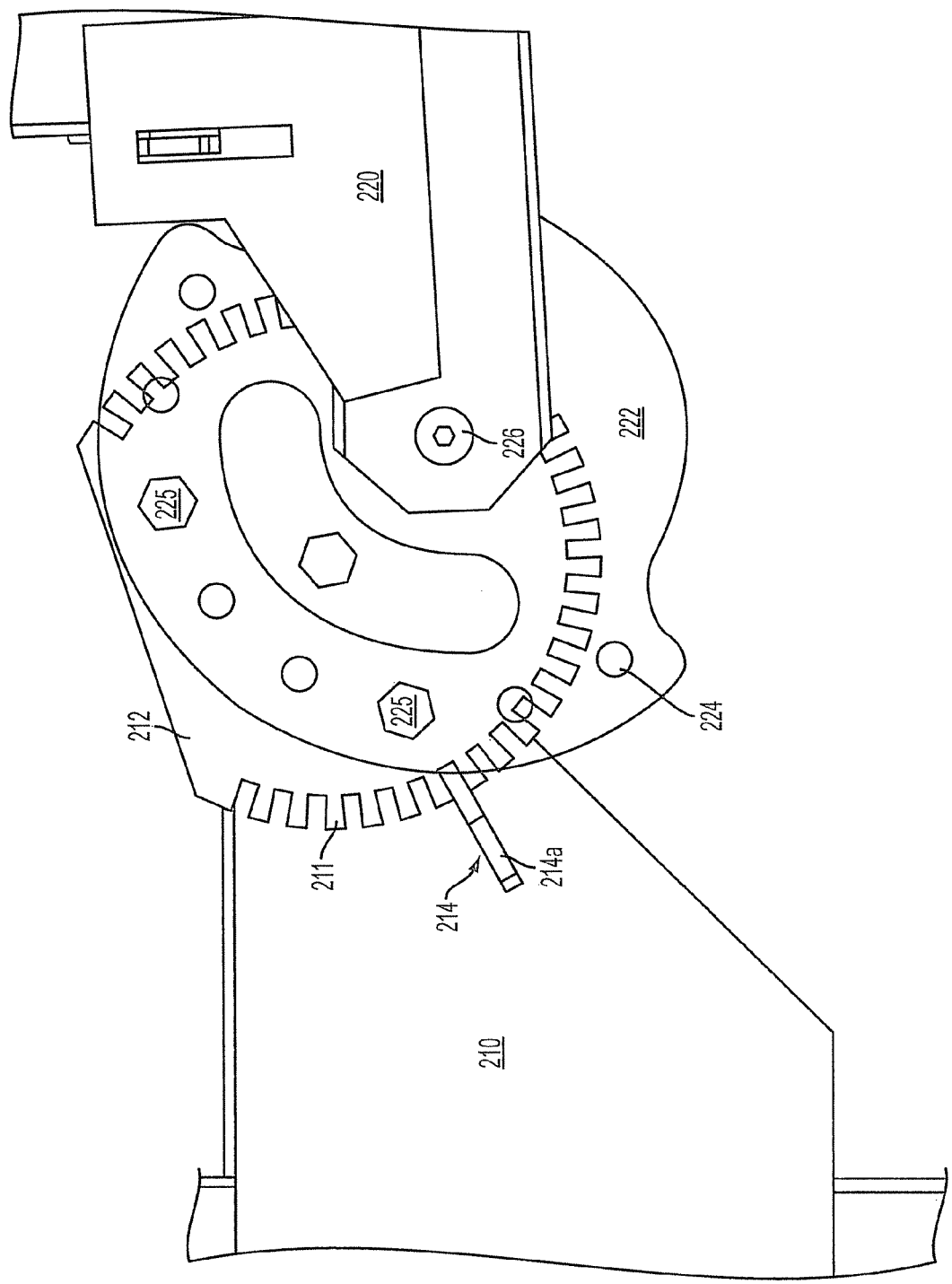
FIG. 30 is a side view of the mainframe and L-arm of FIG. 23 with an associated locking mechanism in a disengaged position.

In some embodiments, the mechanism 200 can also employ a locking mechanism 214 to prevent the L-arm 220 from rotating relative to the adjustment disks 212, 212'. For example, as seen in FIG. 29, when engaged, a portion 214a of the locking mechanism 214 can be disposed between teeth 211 on a circumference of an adjustment disk 212. However, as seen in FIG. 30, when disengaged, the portion 214a of the locking mechanism 214 be can removed from the teeth 211 on the circumference of the adjustment disk 212, allowing the L-arm to be adjusted relative to the disk 212.

As explained above, the connections between the L-arm 220 and the adjustment disks 212, 212' can be adjusted to accommodate for different dimensions of D1, D2, and D3 in different models of trucks. For example, the mechanism 200 may need to be adjusted to accommodate the apparatus 10 in a trailer mode and to accommodate the apparatus 10 in a ramp mode. Specifically, the vertical distance between rotation axis 226 and the ground may need to change when the L-arm 220 and the swing arm 230 are moved so as to move the apparatus 10 between the ramp mode and the trailer mode. Thus, the affixation points 213, 224 can be chosen to allow for different degrees of rotation.

Figure 31A:
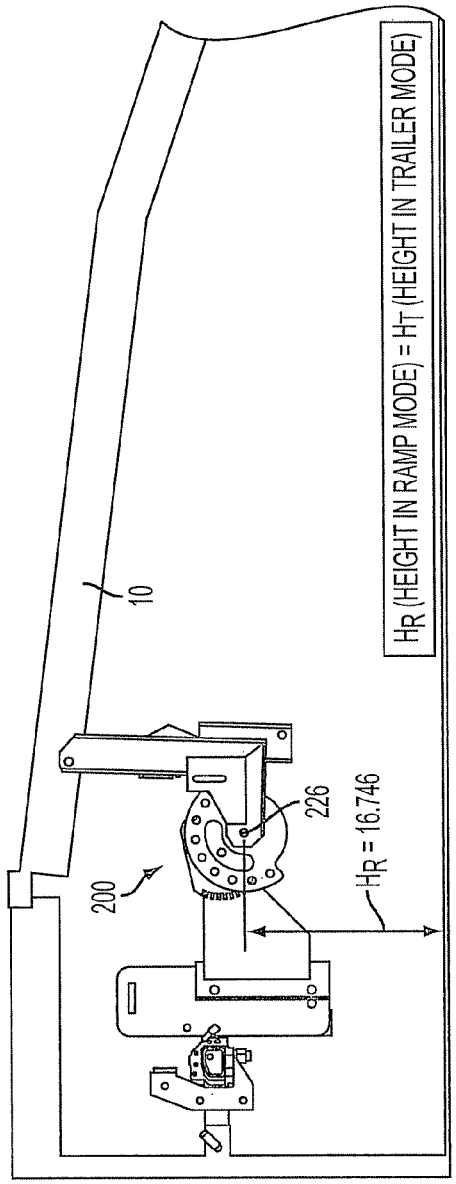
FIG. 31A is a block diagram showing the height $H_R$ of the hitch attachment mechanism of FIG. 23 when an associated apparatus is in a ramp position.
Figure 31B:
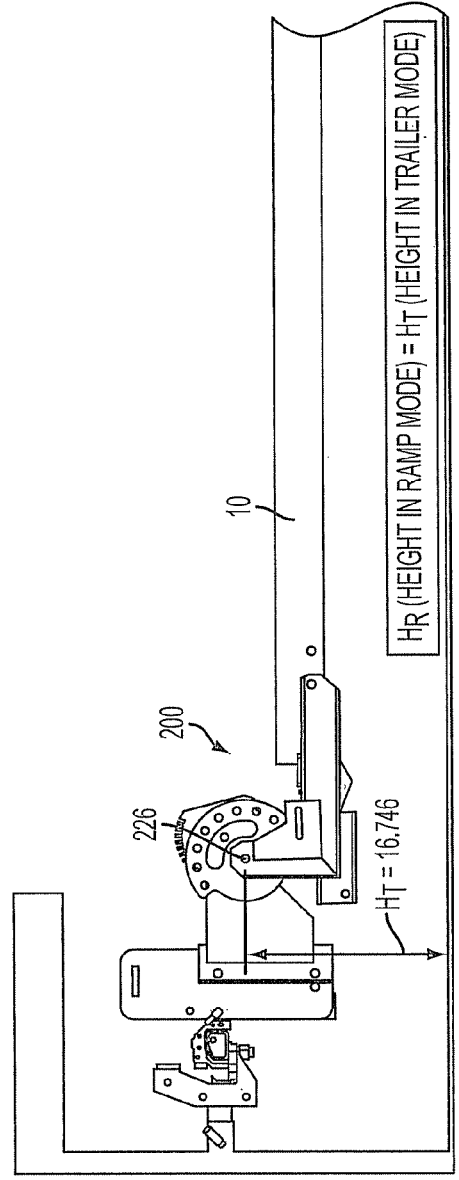
FIG. 31B is a block diagram showing the height $H_T$ of the hitch attachment mechanism of FIG. 23 when an associated apparatus is in a trailer position.

In a first scenario, the dimensions D1, D2, and D3 of a truck can be such that the vertical distance, $H_R$, between the rotation axis 226 and the ground when the mechanism 200 is in ramp mode, is equal to the vertical distance, $H_T$, between the rotation axis 226 and the ground when the mechanism 200 is in a trailer mode. FIGS. 31A and 31B illustrate this first scenario. For example, $H_R$ can equal $H_T$, which can be approximately 16.746 inches. However, the exact measurements of $H_R$ and $H_T$ can vary depending on D1, D2, and/or D3 of the associated truck. As seen in FIGS. 31A and 31B, the mechanism 200, for example, the L-arm 220 and the swing arm 230, can rotate approximately 90° to move from the first position shown in FIG. 31A to the second position shown in FIG. 31B.

Figure 32A:
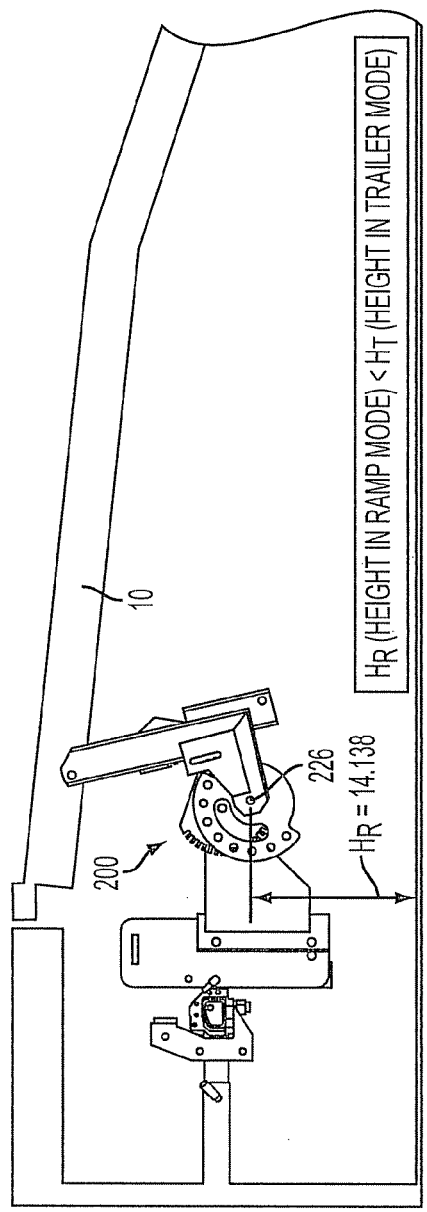
FIG. 32A is a block diagram showing the height $H_R$ of the hitch attachment mechanism of FIG. 23 when an associated apparatus is in a ramp position.
Figure 32B:
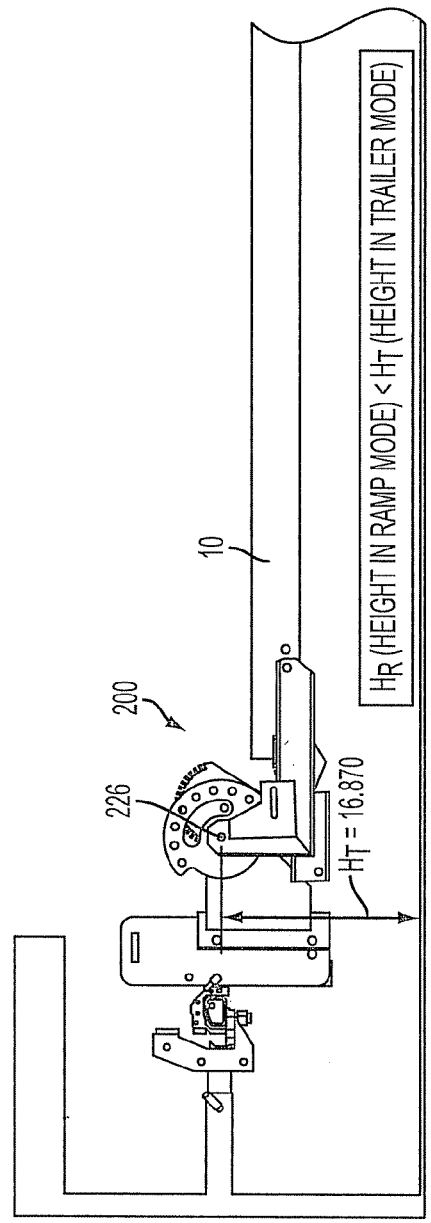
FIG. 32B is a block diagram showing the height $H_T$ of the hitch attachment mechanism of FIG. 23 when an associated apparatus is in a trailer position.

In a second scenario, the dimensions D1, D2, and D3 of a truck can be such that $H_R$ is less than $H_T$. FIGS. 32A and 32B illustrate this second scenario. For example, $H_R$ can be approximately 14.138 inches, and $H_T$ can be approximately 16.870 inches. However, the exact measurements of $H_R$ and $H_T$ can vary depending on D1, D2, and/or D3 of the associated truck. As seen in FIGS. 31A and 31B, the mechanism 200, for example, the L-arm 220 and the swing arm 230, can rotate more than 90° to move from the first position shown in FIG. 32A to the second position shown in FIG. 32B. In some embodiments, the mechanism 200 can rotate approximately 110° to move between the first and second positions.

Figure 33A:
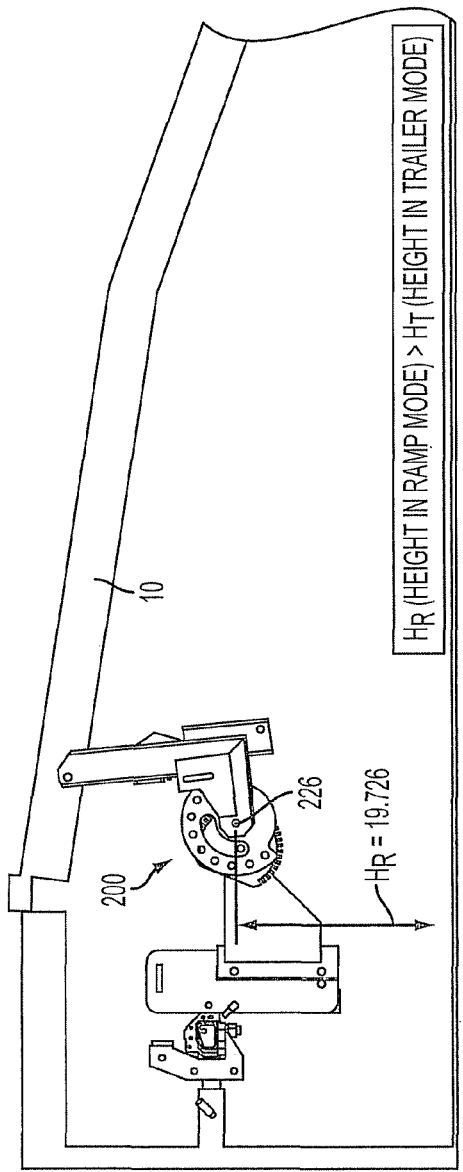
FIG. 33A is a block diagram showing the height $H_R$ of the hitch attachment mechanism of FIG. 23 when an associated apparatus is in a ramp position.
Figure 33B:
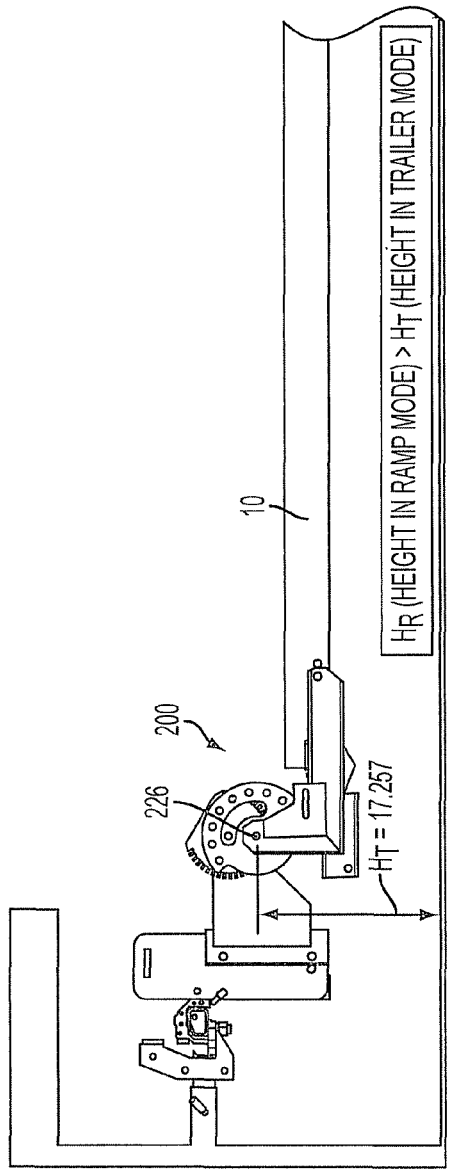
FIG. 33B is a block diagram showing the height $H_T$ of the hitch attachment mechanism of FIG. 23 when an associated apparatus is in a trailer position.

In a third scenario, the dimensions D1, D2, and D3 of a truck can be such that $H_R$ is greater than $H_T$. FIGS. 33A and 33B illustrate this third scenario. For example, $H_R$ can be approximately 19.726 inches, and $H_T$ can be approximately 17.257 inches. However, the exact measurements of $H_R$ and $H_T$ can vary depending on D1, D2, and/or D3 of the associated truck. As seen in FIGS. 33A and 33B, the mechanism 200, specifically, the L-arm 220 and the swing arm 230 can rotate less than 90° to move between the first position shown in FIG. 33A and the second position shown in FIG. 33B.

As explained above, the apparatus 10 can be in a ramp position, a trailer position, or a transport position. When the apparatus 10 is in a trailer position or the transport position, the apparatus 10 can be fixed or locked relative to the mechanism 200. However, when the apparatus 10 is in the ramp position, it is desirable for the apparatus 10 to be unlocked relative to the mechanism 200 so that the apparatus 10 can rotate into the ramp position.

Figure 34:
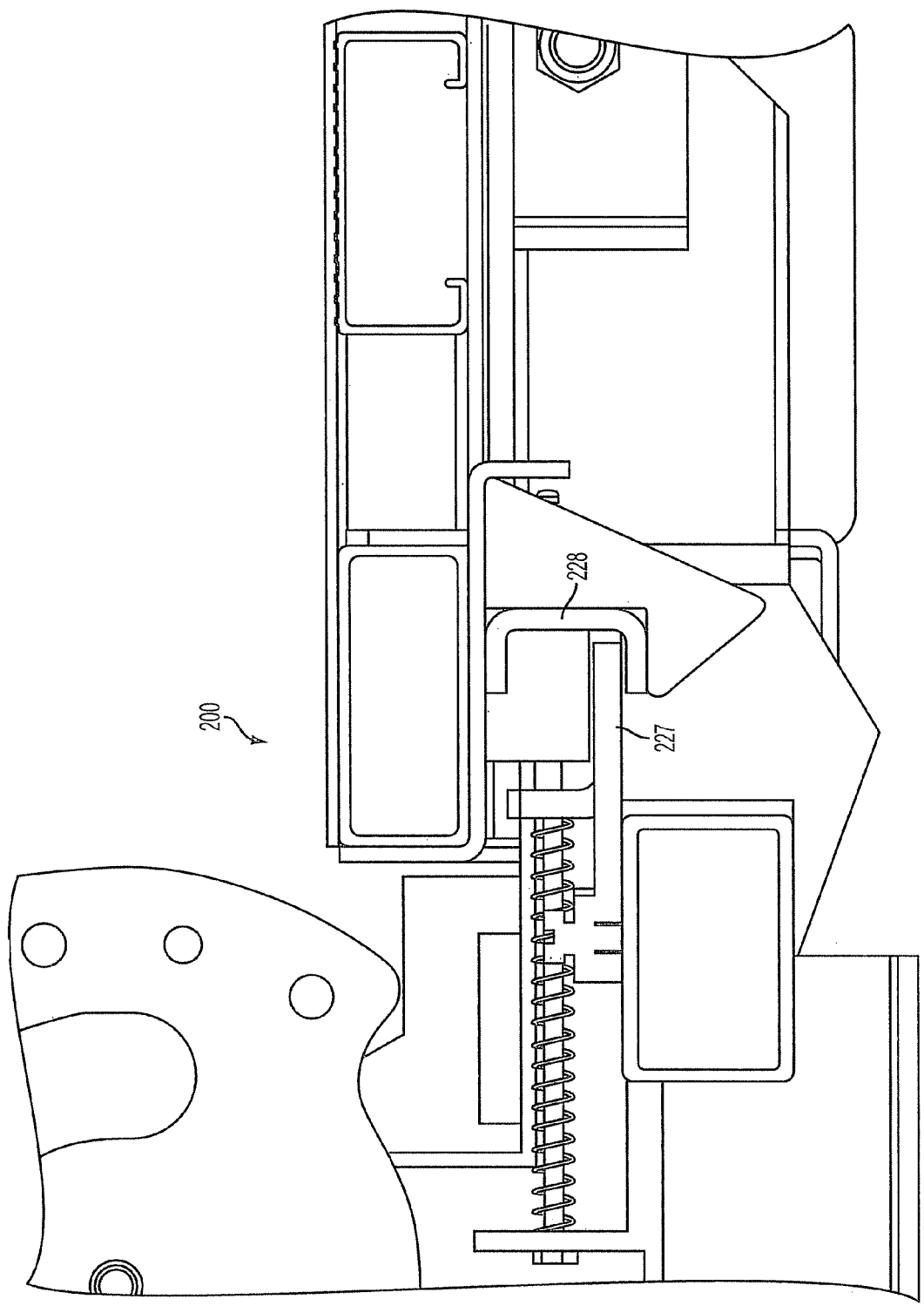
FIG. 34 is a cross-sectional view of the L-arm of FIG. 23 in a locked position.
Figure 35:
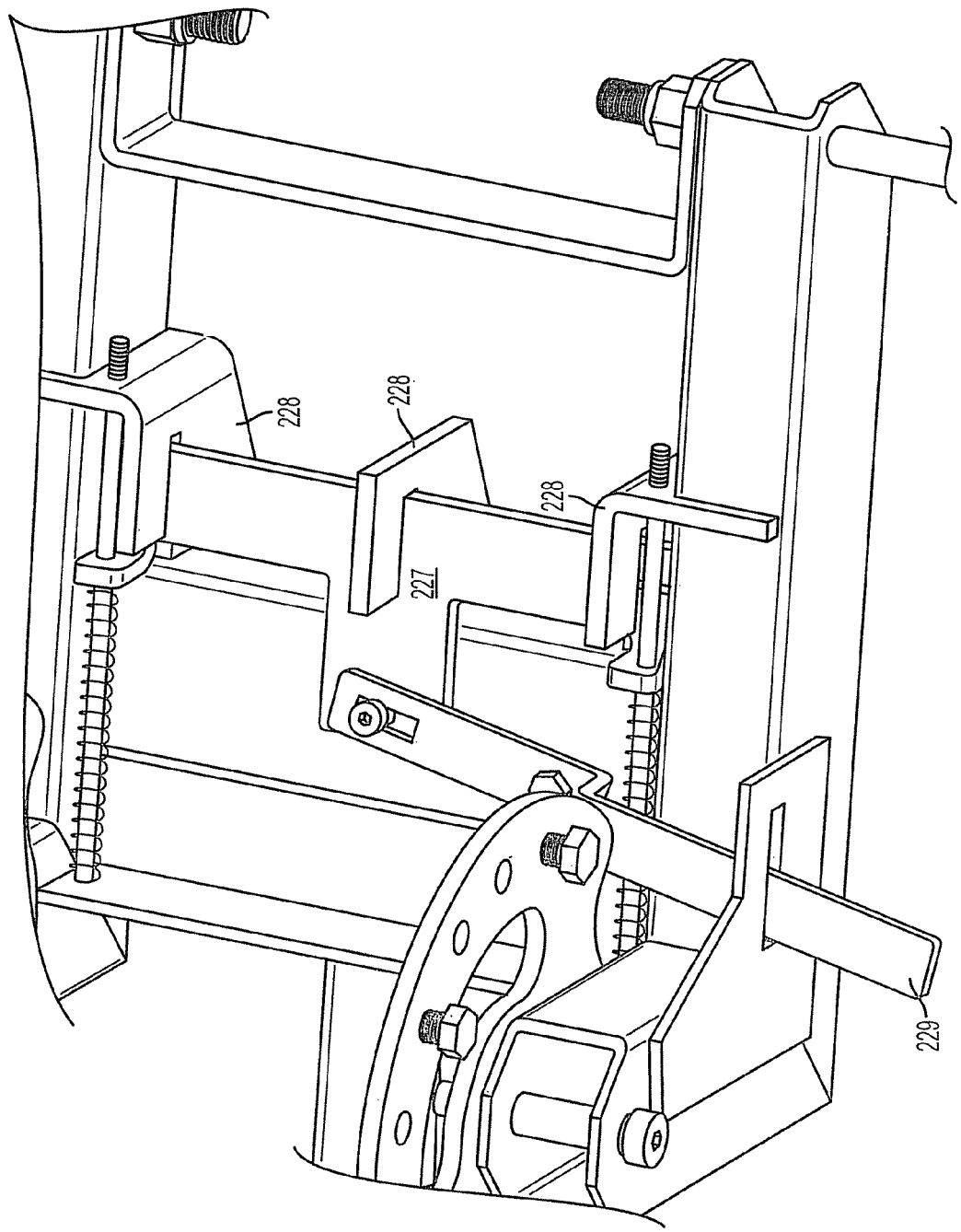
FIG. 35 is a top view of the L-arm of FIG. 23 in a locked position.
Figure 36:
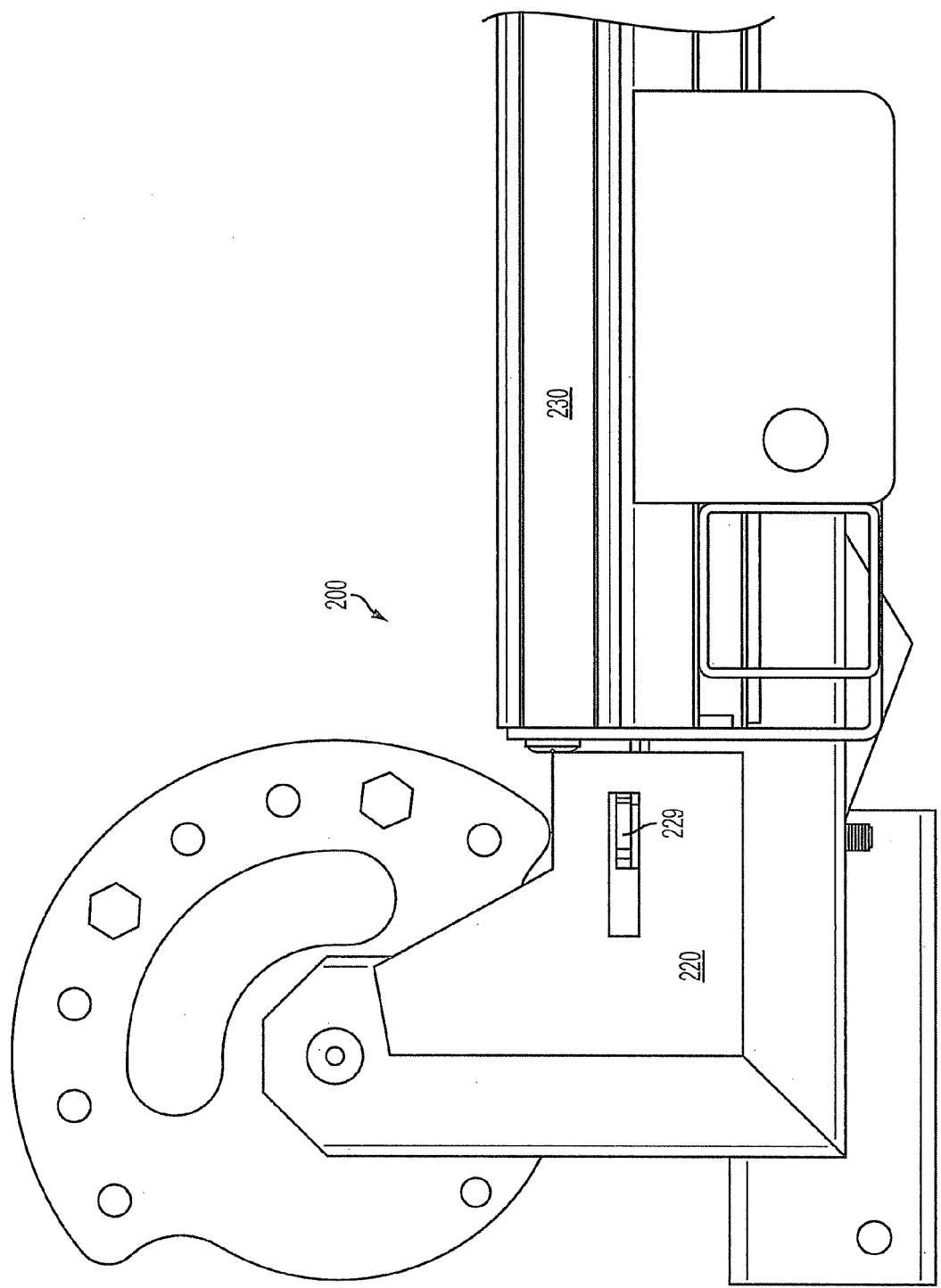
FIG. 36 is a side view of the L-arm and swing arm of FIG. 23 in a locked position.

FIGS. 34-36 are different views of the mechanism 200 in a locked position. As seen in FIG. 34, at least one C-bracket 228 can engage a T-bar 227 of the L-arm 220. When the C-bracket 228 engages the T-bar 227, the swing arm 230 (seen in FIG. 36), and thus, the apparatus 10, connected thereto, can be prevented from rotating relative to the L-arm 220.

As seen in FIG. 35, some disclosed embodiments can include a plurality, for example, three C-brackets 228. Further, a locking arm 229 can be hingedly connected to the T-bar 227 so that when the locking arm 229 is moved to a first position, as seen in FIG. 35, the T-bar 227 can be accordingly moved to a first position in which T-bar 227 is engaged with the C-brackets 228. In some embodiments, the T-bar 227 can be spring loaded so that the T-bar 227 stays in the locked first position until and unless the locking arm 229 is engaged.

Figure 37:
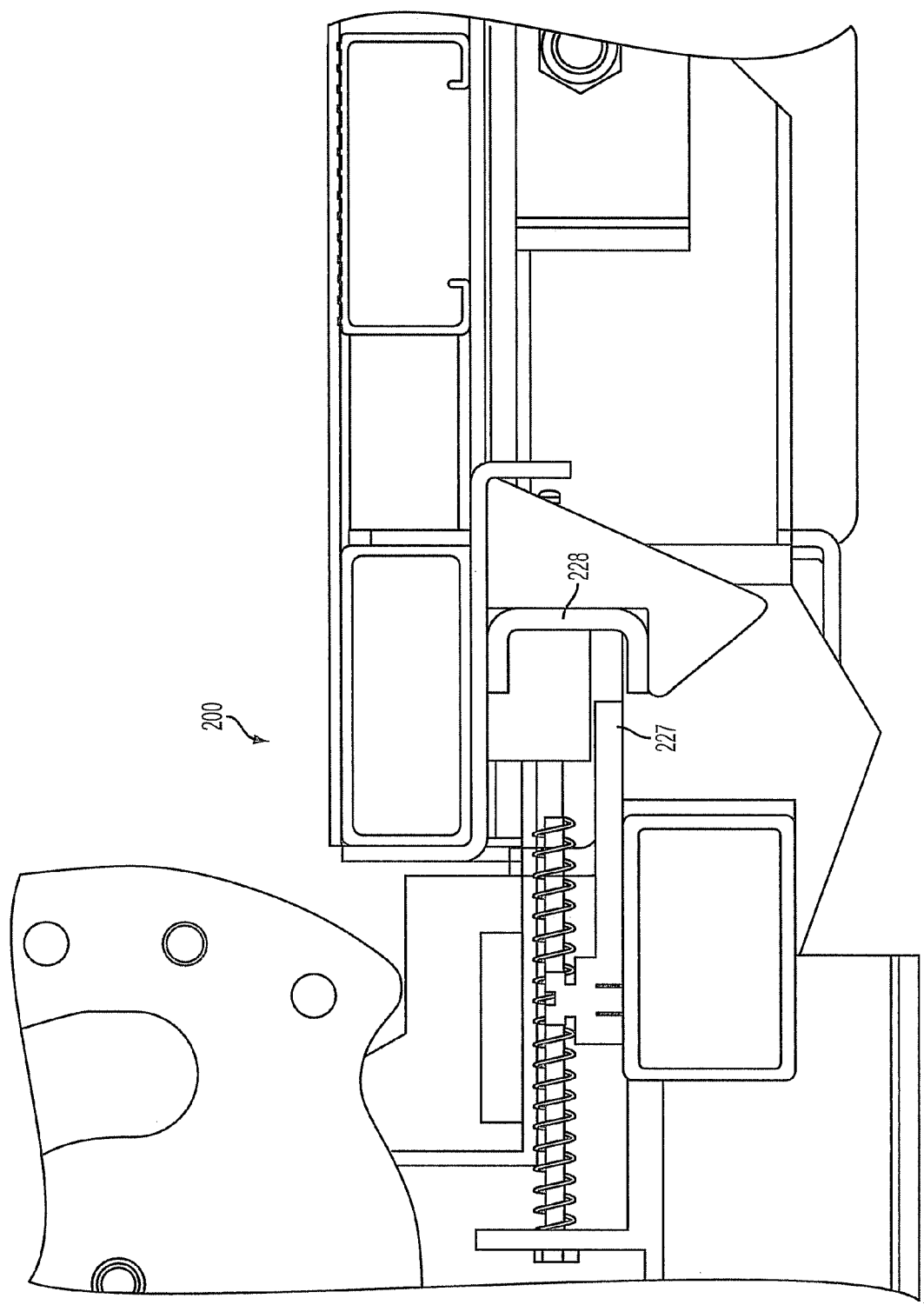
FIG. 37 is a cross-sectional view of the L-arm of FIG. 23 in an unlocked position.
Figure 38:
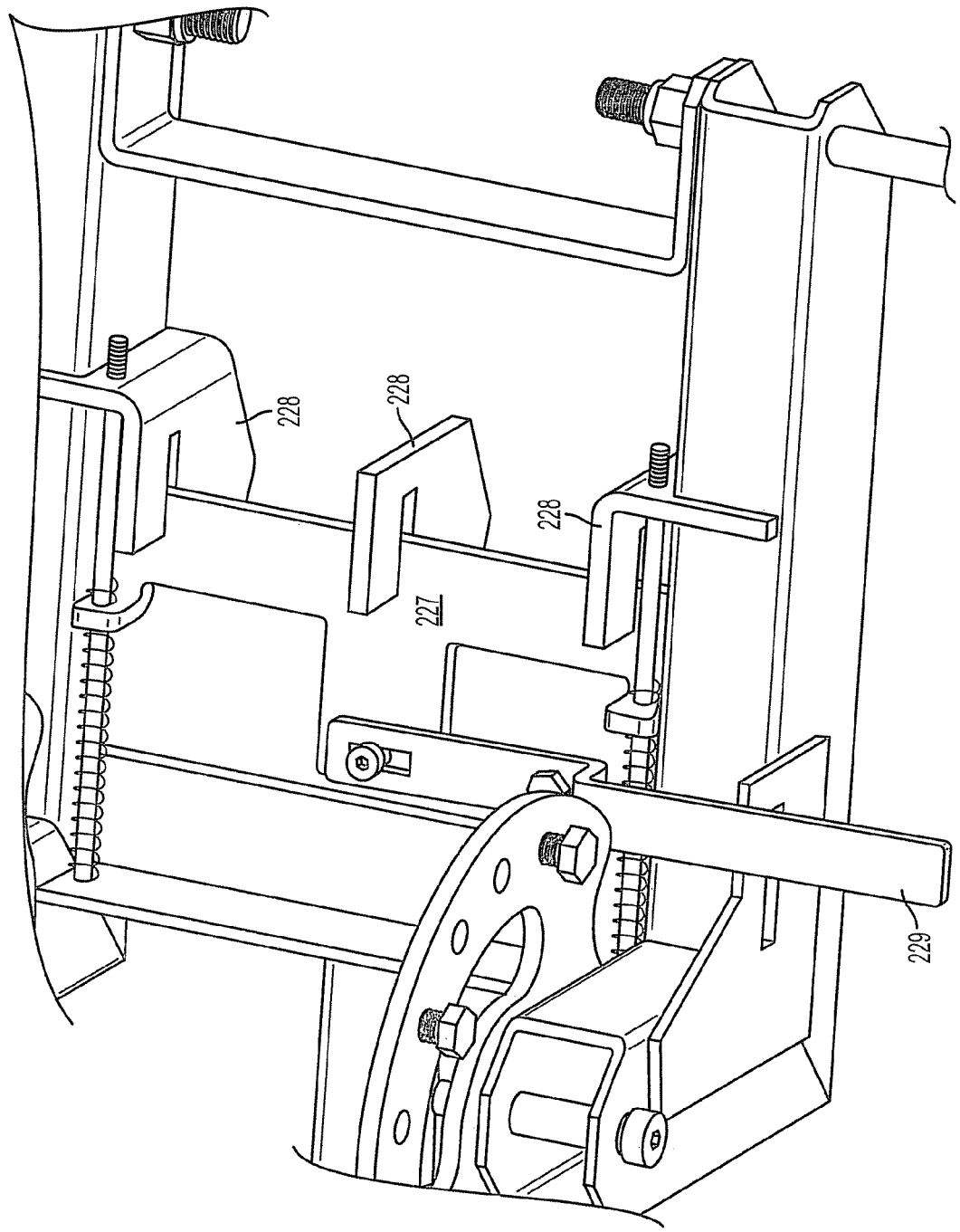
FIG. 38 is a top view of the L-arm of FIG. 23 in an unlocked position.
Figure 39:
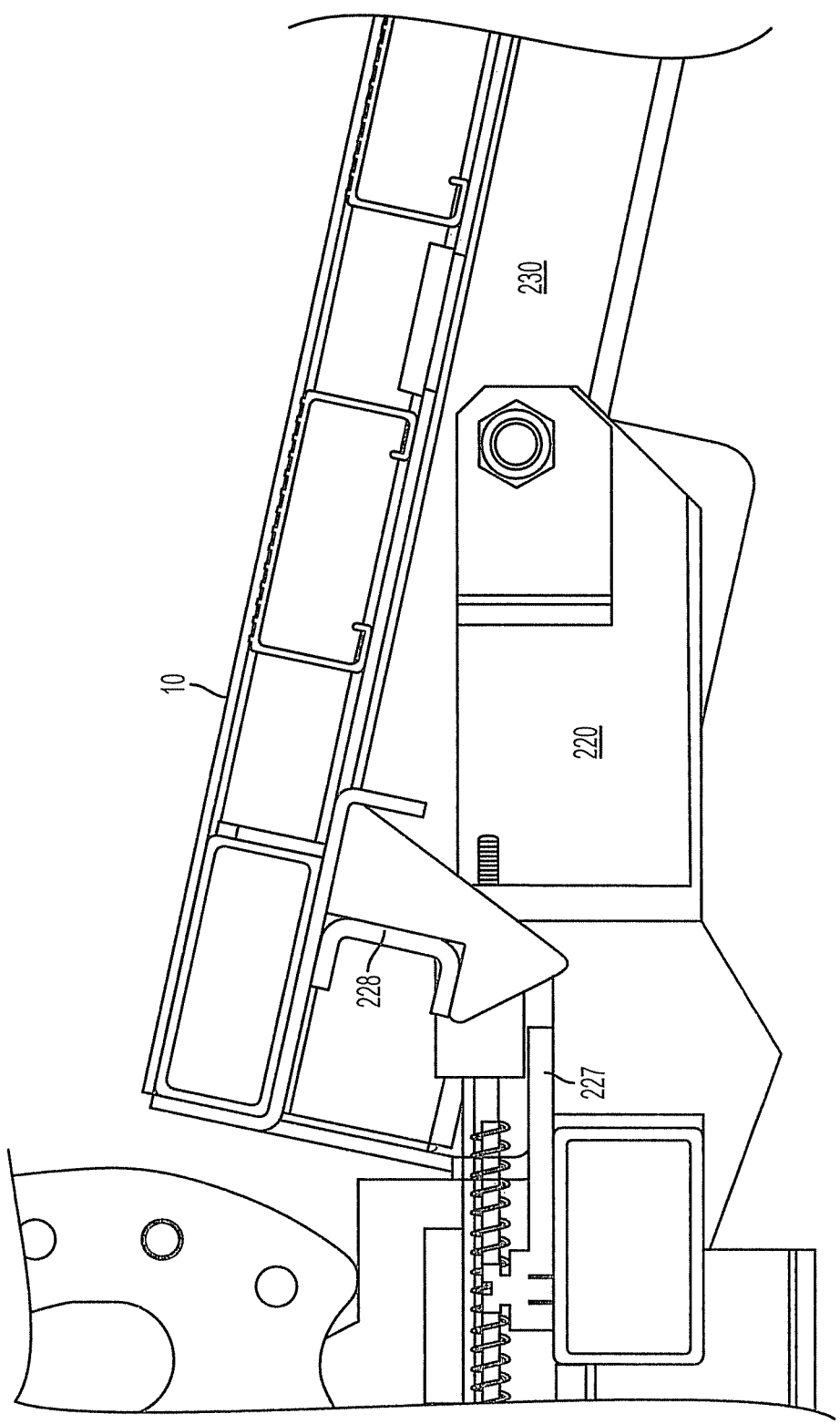
FIG. 39 is a side view of the L-arm and swing arm of FIG. 23 is an unlocked position.

FIGS. 37-39 are different views of the mechanism 200 in an unlocked position. As seen in FIG. 37, the at least one C-bracket 228 can be disengaged from the T-bar 227 of the L-arm 220. When the C-bracket 228 is disengaged from the T-bar 227, the swing arm 230 (seen in FIG. 39), and thus, the apparatus 10 connected thereto, can rotate relative to the L-arm 220.

The locking arm 229 can be moved to a second position as seen in FIG. 38. When the locking arm 229 is moved to the second position, the T-bar 227 can be accordingly moved to a second position in which the T-bar 227 is disengaged from the plurality of C-brackets 228. As seen in FIG. 38, when the locking arm 229 and T-bar 227 are moved to the second position, springs associated with the T-bar 227 can be loaded.

From the foregoing, it will be observed that numerous variations and modifications may be effected without departing from the spirit and scope of the invention. It is to be understood that no limitation with respect to the specific apparatus or method illustrated herein is intended or should be inferred. It is, of course, intended to cover by the appended claims all such modifications as fall within the scope of the claims.

What is claimed:

1. An apparatus comprising:
a mainframe for associating with a hitch of a vehicle;
first and second adjustment disks connected to respective first and second sides of the mainframe;
an L-arm for rotatably and directly connecting to each of the first and second adjustment disks at at least one of a plurality of affixation points;
a drive braced between the mainframe and the L-arm; and
a locking mechanism,
wherein the plurality of affixation points allow for adjustment of a connection between the L-arm and each of the first and second adjustment disks in at least three dimensions of the vehicle,
wherein the at least three dimensions of the vehicle include a first dimension representing a vertical distance from an open bed door of the vehicle to the ground, a second dimension representing a vertical distance from the hitch of the vehicle to the ground, and a third dimension representing a horizontal distance from the hitch of the vehicle to a distal end of the open bed door, and
wherein, when the locking mechanism is engaged, at least a portion of the locking mechanism is disposed between teeth on a circumference of at least one of the first and second adjustment disks and prevents rotation of the L-arm about a rotation axis.

2. The apparatus of claim 1 wherein the drive includes a scissors jack.

3. The apparatus of claim 1 wherein the L-arm includes first and second arced connection members, and wherein each of the plurality of affixation points is disposed in the first and second arced connection members.

4. The apparatus of claim 3 wherein the plurality of affixation points includes a plurality of apertures disposed in the first and second arced connection members, and wherein each of the plurality of apertures is capable of receiving an attachment mechanism.

5. The apparatus of claim 4 wherein the attachment mechanism disposed in at least one of the plurality of apertures fixes the L-arm relative to at least one of the first and second adjustment disks.

6. The apparatus of claim 1 wherein the L-arm is capable of rotating a predetermined number of degrees about the rotation axis to move from a first position to a second position.

7. The apparatus of claim 6 wherein the predetermined number of degrees is determined by the at least one of the plurality of affixation points at which the L-arm connects to the first and second adjustment disks.

8. The apparatus of claim 6 wherein the predetermined number of degrees includes less than 90° and more than 90°.

9. An apparatus comprising:
a mainframe for associating with a hitch of a vehicle;
first and second adjustment disks connected to respective first and second sides of the mainframe;
an L-arm for rotatably and directly connecting to each of the first and second adjustment disks at at least one of a plurality of affixation points;
a drive braced between the mainframe and the L-arm;
a swing arm connected to the L-arm, the swing arm associated with a device capable of moving between ramp, trailer, and transport positions; and
a locking mechanism,
wherein the plurality of affixation points allow for adjustment of a connection between the L-arm and each of the first and second adjustment disks in at least three dimensions of the vehicle,
wherein the at least three dimensions of the vehicle include a first dimension representing a vertical distance from an open bed door of the vehicle to the ground, a second dimension representing a vertical distance from the hitch of the vehicle to the ground, and a third dimension representing a horizontal distance from the hitch of the vehicle to a distal end of the open bed door, and
wherein, when the locking mechanism is engaged, at least a portion of the locking mechanism is disposed between teeth on a circumference of at least one of the first and second adjustment disks and prevents rotation of the L-arm about a rotation axis.

10. The apparatus of claim 9 wherein the L-arm is capable of rotating a predetermined number of degrees about the rotation axis to move from a first position to a second position.

11. The apparatus of claim 10 wherein, when the L-arm is in the first position, the device is in the ramp position.

12. The apparatus of claim 10 wherein, when the L-arm is in the second position, the device is in the trailer position.

13. The apparatus of claim 10 wherein a height of the L-arm adjusts when the L-arm moves from the first position to the second position, and wherein an adjustment of the height of the L-arm accommodates for the at least three dimensions of the vehicle.

14. An apparatus comprising:
a mainframe for associating with a hitch of a vehicle;
first and second adjustment disks connected to respective first and second sides of the mainframe;
an L-arm for rotatably and directly connecting to each of the first and second adjustment disks at at least one of a plurality of affixation points;
a drive braced between the mainframe and the L-arm;
a swing arm connected to the L-arm, the swing arm associated with a device capable of moving between ramp, trailer, and transport positions; and
a locking mechanism between the L-arm and the swing arm,
wherein the plurality of affixation points allow for adjustment of a connection between the L-arm and each of the first and second adjustment disks in at least three dimensions of the vehicle,
wherein the at least three dimensions of the vehicle include a first dimension representing a vertical distance from an open bed door of the vehicle to the ground, a second dimension representing a vertical distance from the hitch of the vehicle to the ground, and a third dimension representing a horizontal distance from the hitch of the vehicle to a distal end of the open bed door,
wherein, when the locking mechanism is engaged, the locking mechanism prevents rotation of the swing arm relative to the L-arm,
wherein, when disengaged, the locking mechanism allows for the rotation of the swing arm relative the L-arm,
wherein the locking mechanism includes at least one C-bracket and a T-bar,
wherein, when the locking mechanism is in a first position, the at least one C-bracket cups at least a portion of the T-bar to engage the locking mechanism, and
wherein, when the locking mechanism is in a second position, the at least one C-bracket de-cups the at least one portion of the T-bar to engage the locking mechanism.

15. The apparatus of claim 14 wherein the locking mechanism includes a locking arm hingedly connected to the T-bar, wherein, when the locking arm is in a first position, the T-bar is cupped by the at least one C-bracket, and wherein, when the locking arm is in a second position, the T-bar is de-cupped from the at least one C-bracket.

16. The apparatus of claim 14 wherein the locking mechanism includes at least one spring associated with the T-bar, the at least one spring being loaded when the T-bar is de-cupped from the at least one C-bracket.

17. The apparatus of claim 14 wherein the device rotates in accordance with the rotation of the swing arm.

* * * * *